United States Patent
Kisaka et al.

(10) Patent No.: US 9,598,023 B2
(45) Date of Patent: Mar. 21, 2017

(54) BICYCLE-FORK SUPPORT DEVICE

(71) Applicant: CAR MATE MFG. CO., LTD., Tokyo (JP)

(72) Inventors: Daisuke Kisaka, Tokyo (JP); Yasutaka Usuki, Wako (JP); Hideaki Okano, Tokyo (JP); Suguru Uejima, Tokyo (JP)

(73) Assignee: CAR MATE MFG. CO., LTD., Tokyo (JP)

( * ) Notice: Subject to any disclaimer, the term of this patent is extended or adjusted under 35 U.S.C. 154(b) by 27 days.

(21) Appl. No.: 14/427,521

(22) PCT Filed: Sep. 13, 2013

(86) PCT No.: PCT/JP2013/005446
§ 371 (c)(1),
(2) Date: Mar. 11, 2015

(87) PCT Pub. No.: WO2014/041817
PCT Pub. Date: Mar. 20, 2014

(65) Prior Publication Data
US 2015/0210222 A1 Jul. 30, 2015

(30) Foreign Application Priority Data
Sep. 14, 2012 (JP) ................................. 2012-203592

(51) Int. Cl.
*B60R 9/10* (2006.01)
*B60R 9/048* (2006.01)
(52) U.S. Cl.
CPC ................ *B60R 9/10* (2013.01); *B60R 9/048* (2013.01)
(58) Field of Classification Search
CPC ....... B60R 9/10; B60R 9/048; B62K 2206/00; B62K 25/02; Y10S 224/924
(Continued)

(56) References Cited

U.S. PATENT DOCUMENTS 3,828,993 A * 8/1974 Carter ..................... B60R 9/048
211/22
5,337,587 A * 8/1994 Davidson ............... B62H 5/001
280/279

(Continued)

FOREIGN PATENT DOCUMENTS

JP H07-10054 A 1/1995
JP 2002-264730 A 9/2002
(Continued)

OTHER PUBLICATIONS

Dec. 10, 2013 Search Report issued in International Application No. PCT/JP2013/005446.

Primary Examiner — Nathan J Newhouse
Assistant Examiner — Scott McNurlen
(74) Attorney, Agent, or Firm — Oliff PLC

(57) ABSTRACT

A bicycle-fork support device configured to hold: a conventional fork, allowing insertion of a quick-release-skewer support shaft, in a lower end portion of the fork of a bicycle; a through-axle fork where a through-axle insertion hole for securing a through-axle hub formed in a lower end portion of the through-axle fork, and configured to deal with outer diameters of through-axle forks. The support-fork switching unit includes: a support-device main body where a hollow portion is formed; end portions formed in right and left end portions of the hollow portion; a conventional-fork-use supporting body including, a contacting portion formed with an internal shape that fits the support shaft; a through-axle-fork-use supporting body including, a contacting portion formed with an internal shape that fits the through axle; and a unit for removably mounting any of the supporting bodies on the right and left end portions.

16 Claims, 18 Drawing Sheets

(58) Field of Classification Search
USPC .................................... 224/924; 301/124.2
See application file for complete search history.

(56) References Cited

U.S. PATENT DOCUMENTS

| | | | | |
|---|---|---|---|---|
| 6,036,069 | A * | 3/2000 | Sayegh | B60R 9/048 224/324 |
| 6,439,397 | B1 * | 8/2002 | Reeves | B60R 9/048 211/17 |
| 2008/0061198 | A1 * | 3/2008 | Noyes | B60R 9/048 248/205.1 |
| 2008/0197602 | A1 * | 8/2008 | Watarai | B62K 25/02 280/281.1 |
| 2009/0274406 | A1 * | 11/2009 | Spahr | B60B 27/026 384/545 |
| 2010/0078454 | A1 | 4/2010 | Sautter et al. | |
| 2013/0062379 | A1 * | 3/2013 | Sautter | B60R 9/10 224/324 |
| 2015/0151687 | A1 * | 6/2015 | Tsai | B60R 9/10 224/324 |

FOREIGN PATENT DOCUMENTS

| | | |
|---|---|---|
| JP | 2004-161020 A | 6/2004 |
| JP | 2009-506921 A | 2/2009 |

* cited by examiner

US 9,598,023 B2

BICYCLE-FORK SUPPORT DEVICE

TECHNICAL FIELD

The present invention relates to a support device for holding the fork portion of a bicycle to secure the bicycle to the floor surface in the cabin of an automobile, a rack disposed on the roof or at the rear of an automobile, another vehicle other than an automobile, or at home.

BACKGROUND ART

As fork support device for a bicycle mounted on a conventional automobile, for example, Japanese Unexamined Patent Application Publication No. 7-10054 illustrated in FIG. 38 discloses the following configuration. A fork support device 300 is secured to a carrier bar 12 placed on the roof of an automobile. The bicycle includes a pair of conventional forks 20 where inverse U-shaped groove portions 21 are formed in the lower portions. The groove portion 21 of the conventional fork 20 is formed to allow accepting a support shaft 302 of a quick release skewer 301, which supports the hub of the wheel of the bicycle. The fork support device 300 includes: a fork base 303, which holds the support shaft 302 to allow free insertion of the support shaft 302; a support surface 304, which is arranged in one end portion of the support shaft 302 and can push one of the conventional forks 20 from the side surface; and an adjusting knob 306, which is threadably mounted on a screw portion 305 formed in the other end portion of the support shaft 302. The rotation operation of a lever 307 arranged between the fork base 303 and the adjusting knob 306 causes movement of the support shaft 302 to the lever 307 side, so as to secure the conventional forks 20 of the bicycle to the fork support device 300.

However, like Japanese Unexamined Patent Application Publication No. 7-10054, the drawback of the conventional structure where the conventional forks 20 of the conventional bicycle are secured by the support shaft 302 of the quick release skewer 301 is that a lot of types of mountain bikes and off-road bicycles cannot be secured. As the reason, since many mountain bikes and off-road bicycles employ through-axle wheels, these bikes do not have the inverse U-shaped groove portions 21 of the conventional forks 20 and include a closed opening portion, which receives an axle, a wheel hub member, or a hole cylinder, in the end positions of through-axle forks, which hold the through-axle wheels. Accordingly, the conventional fork support device 300, which is designed to secure the conventional fork 20, cannot secure a through axle for securing through-axle hubs with different outer diameters.

Accordingly, Japanese Unexamined Patent Application Publication No. 2004-161020 illustrated in FIG. 39 and FIG. 40 discloses the following technology. A fork support device 310 is secured to the carrier bar 12. For a downhill type bicycle, to secure the forks of a bicycle using a through axle with a diameter of, for example, 20 mm, an intermediate rod 312, which has an inner diameter fitting the outer diameter of a fork supporting shaft 311 for holding the conventional forks 20 of the bicycle, is changed corresponding to the through axle. Accordingly, the forks of the downhill type bicycle are directly secured to a supporting unit 313.

In Japanese Translation of PCT International Application Publication No. JP-T-2009-506921 illustrated in FIGS. 41, 42, and 43, a fork support device 330 is secured to the carrier bar 12. The fork support device 330 is configured to allow securing both of: the conventional forks 20 secured by the support shaft of the conventional quick release skewer, and a through-axle fork 331 secured by a through axle. As this fork support device 330, a disclosed fork support device includes a hole 334 formed in a fork mount to allow passage of a through-axle fork adaptor 332 or a conventional fork adaptor 333 and house this adaptor.

Here, in both Japanese Unexamined Patent Application Publication No. 2004-161020 and Japanese Translation of PCT International Application Publication No. JP-T-2009-506921 where the through-axle fork can be secured, there is no antitheft means for a bicycle of a through axle type.

Patent Document 1: Japanese Unexamined Patent Application Publication No. 7-10054
Patent Document 2: Japanese Unexamined Patent Application Publication No. 2004-161020
Patent Document 3: Japanese Translation of PCT International Application Publication No. JP-T-2009-506921

DISCLOSURE OF THE INVENTION

Problems to be Solved by the Invention

Using the technology disclosed in Japanese Unexamined Patent Application Publication No. 2004-161020, to secure both the conventional forks 20 of the bicycle and the through-axle forks to the supporting unit 313, when the fork supporting shaft 311 for the conventional forks 20 are held, it is necessary to use the intermediate rod 312 formed to have the outer diameter identical to the outer diameter of the through axle. The supporting unit 313 is constituted of a main body frame 315 secured to a tray 314, one rod supporting tool 317, a spring 318, a restriction pin 319 for this spring 318, another rod supporting tool 321, and a lever unit 322. The one rod supporting tool 317 has a vertically intermediate portion pivoted to be swingable via one pivot pin 316, which extends in the direction perpendicular to the longitudinal direction of the tray 314 at one side in the upper portion of the main body frame 315. The spring 318 restricts this one rod supporting tool 317 in the direction in which the upper portion of the one rod supporting tool 317 is always opened. The other rod supporting tool 321 has a vertically intermediate portion pivoted to be swingable via another pivot pin 320, which extends in the direction identical to that of the one pivot pin 316 at another side in the upper portion of the main body frame 315. The lever unit 322 causes this other rod supporting tool 321 to swing toward the direction in which the upper portion of the other rod supporting tool 321 approaches the one rod supporting tool 317. Therefore, there are drawbacks that the complicated configuration increases the cost, increases in size, and increases in weight. Dealing with through-axle forks having a plurality of types of outer diameters is not disclosed.

The technology disclosed in Japanese Translation of PCT International Application Publication No. JP-T-2009-506921 discloses the following configuration. To secure both the conventional forks 20 and the through-axle fork 331 of the bicycles to the fork support device 330, the inner diameter of the hole 334, which is formed in the fork support device 330, is formed to fit the rod outer diameter for the through-axle fork 331 or the through-axle fork adaptor 332. Additionally, the fork adaptor 333 for the conventional forks has: the inner diameter fitting the outer diameter of the holding rod for the conventional forks 20; and the outer diameter fitting the inner diameter of the hole 334 formed in the fork support device 330. When a bicycle with a fork holding rod for the conventional forks 20 is secured, it is necessary to separately prepare the fork adaptor 333, which is formed to have the outer diameter identical to the outer diameter of the rod for the through-axle fork adaptor 332, for the conventional forks. When a bicycle with the through-axle fork 331 is secured, it is necessary to separately prepare the through-axle fork adaptor 332. The method to deal with the through-axle fork for a plurality of types of outer diameters is not specifically described.

An object of the present invention is to realize a bicycle-fork support device that is configured to hold bicycles having: a conventional fork where an inverse U-shaped or C-shaped groove portion, which allows insertion of a support shaft with a shaft diameter of 9 mm, is formed in a lower end portion of the fork of a bicycle; and a through-axle fork where a through-axle insertion hole for securing a through-axle hub is formed in a lower end portion of the through-axle fork, and is configured to deal with outer diameters for a plurality of through-axle forks, using a simple configuration that causes excellent work efficiency at low cost.

Another object is to provide, using the present invention, an antitheft function for a bicycle in the case of holding any of: a conventional fork where an inverse U-shaped or C-shaped groove portion, which allows insertion of a support shaft with a shaft diameter of 9 mm, is formed in a lower end portion of the fork of a bicycle; and a through-axle fork where a through-axle insertion hole for securing a through-axle hub is formed in a lower end portion of the through-axle fork, when a bicycle is secured outside of a car.

Solutions to the Problems

The bicycle-fork support device according to the present invention is a bicycle-fork support device for removably securing a fork distal end portion of a bicycle in a state where a front wheel hub is removed from the bicycle. The support device includes a support-fork switching unit configured to support at least two types of forks including a conventional fork and a through-axle fork. In the conventional fork, an inverse U-shaped or C-shaped groove portion is formed in a lower end portion of the conventional fork. The groove portion allows insertion of a quick-release-skewer support shaft of a conventional bicycle. In the through-axle fork, a through-axle insertion hole for securing a through-axle hub is formed in a lower end portion of the through-axle fork. The support-fork switching unit includes: a support-device main body; open end portions; and a unit configured to switch to the open end portion for the conventional fork or the through-axle fork corresponding to a type of support fork. In the support-device main body, a hollow portion is formed to pass through the support-device main body in a right-left direction. The hollow portion allows passage of both the quick-release-skewer support shaft and the through axle. The open end portions are arranged in respective right and left end portions of the hollow portion.

Further, according to the bicycle-fork support device of the present invention, the open end portions arranged in the respective right and left end portions of the hollow portion of the support-device main body include: a pair of conventional-fork-use supporting bodies; a pair of through-axle-fork-use supporting bodies; and a unit configured to removably mount a portion at another side of the supporting body selected as any of the conventional-fork-use supporting body and the through-axle-fork-use supporting body corresponding to a type of fork to support, on the right and left end portions of the support-device main body. The pair of conventional-fork-use supporting bodies include a contacting portion formed at least in a position at one side while the contacting portion has an internal shape that fits the support shaft of the quick release skewer. The pair of through-axle-fork-use supporting bodies include a contacting portion formed at least in a position at one side while the contacting portion has an internal shape that fits the through axle.

Further, the following configuration is preferred. The unit configured to removably mount the supporting bodies on the right and left end portions includes: respective outer peripheral portions formed in the right and left end portions; and inner peripheral portions formed in the positions at the other side of the supporting bodies. The inner peripheral portions are mountable to the outer peripheral portions of the end portion.

Further, the following configuration is preferred. The unit configured to removably mount the supporting bodies on the right and left end portions includes: locking portions formed in the outer peripheral portions of the right and left end portions; and an engaging unit for engaging the locking portion. The engaging unit is formed in the inner peripheral portions in the positions at the other side of the supporting bodies.

Further, the following configuration is preferred. The unit configured to removably mount the supporting bodies on the right and left end portions includes: a friction unit arranged in at least one of the outer peripheral portions of the right and left end portions; and the inner peripheral portions formed in the positions at the other side of the supporting bodies.

Further, the following configuration is preferred. The unit configured to removably mount the supporting bodies on the right and left end portions includes: respective inner peripheral portions formed in the right and left end portions; and outer peripheral portions formed in the positions at the other side of the supporting bodies. The outer peripheral portions are mountable to the inner peripheral portions of the end portion.

Further, the following configuration is preferred. The unit configured to removably mount the supporting bodies on the right and left end portions includes: locking portions formed in the inner peripheral portions of the right and left end portions; and an engaging unit for engaging the locking portion. The engaging unit is formed in the outer peripheral portions in the positions at the other side of the supporting bodies.

Further, the following configuration is preferred. The unit configured to removably mount the supporting bodies on the right and left end portions includes: a friction unit arranged in at least one of: the inner peripheral portions of the right and left end portions; and the outer peripheral portions formed in the positions at the other side of the supporting bodies.

Further, the following configuration is preferred. As the through-axle-fork-use supporting bodies, at least a 15-mm through-axle supporting body and a 20-mm through-axle supporting body are prepared in advance. The 15-mm through-axle supporting body includes a contacting portion with an internal shape that fits a through axle with a nominal diameter of 15 mm. The 20-mm through-axle supporting body includes a contacting portion with an internal shape that fits a through axle with a nominal diameter of 20 mm.

Further, the following configuration is preferred. The support device includes a guarding member where a guarding portion is formed. The guarding portion is configured to prevent the through axle from moving in a pull-out direction.

Further, the following configuration is preferred. The guarding member is removable with respect to the support-device main body, and includes: an arm portion and a guarding portion. The arm portion extends in at least one direction of right and left directions in a state mounted on the support-device main body. The guarding portion is arranged at an extending-portion position of an axis line of the through axle at a distal end position of the arm portion. The key unit is configured to maintain a mounted state of the guarding member on the support-device main body in an antitheft state.

Further, the following configuration is preferred. On a top surface of the support-device main body, a space portion is formed. The space portion allows arranging a handle portion of the quick release skewer. In an upper portion of the support-device main body, a cover member is arranged. The cover member covers a top surface of the space portion formed in the upper portion of the support-device main body. A key mechanism mounted on the cover member is configured to control opening and closing of the cover member with respect to the support-device main body. The guarding member is securable between the support-device main body and the cover member.

Further, the following configuration is preferred. The guarding member is movable with respect to the support-device main body, and includes: an arm portion and a guarding portion. The arm portion extends in at least one direction of right and left directions in a state mounted on the support-device main body. The guarding portion is arranged at an extending-portion position of an axis line of the through axle at a distal end position of the arm portion. The key unit is configured to maintain a moving position of the guarding member with respect to the support-device main body in an antitheft state.

Further, the following configuration is preferred. On a top surface of the support-device main body, a space portion is formed. The space portion allows arranging a handle portion of the quick release skewer. In an upper portion of the support-device main body, a cover member is arranged. The cover member covers a top surface of the space portion formed in the upper portion of the support-device main body. A key mechanism mounted on the cover member is configured to control opening and closing of the cover member with respect to the support-device main body. In a state where the cover member is closed, the cover member is configured to cover an adjusting unit configured to adjust the moving position of the guarding member formed in the support-device main body.

Effects of the Invention

The bicycle-fork support device of the present invention can hold the bicycles having: the conventional fork where the inverse U-shaped or C-shaped groove portion, which allows insertion of the support shaft with a shaft diameter of 9 mm, is formed in the lower end portion of the fork of the bicycle; and the through-axle fork where the through-axle insertion hole for securing the through-axle hub is formed in the lower end portion of the through-axle fork. This configuration further includes the support-fork switching unit that is configured to deal with outer diameters for a plurality of through-axle forks. The support-fork switching unit has the simple configuration, and thus can be manufactured at low cost. Further, since the support-fork switching unit provides excellent work efficiency, the work time becomes a short time. The possibility of the occurrence of dropping off due to an assembling failure by a worker is extremely reduced. Also in this point, an excellent effect is provided.

Further, it is possible provide, using the present invention, an antitheft function for a bicycle in the case of holding any of: a conventional fork where an inverse U-shaped or C-shaped groove portion, which allows insertion of a support shaft with a shaft diameter of 9 mm, is formed in a lower end portion of the fork of a bicycle; and a through-axle fork where a through-axle insertion hole for securing a through-axle hub is formed in a lower end portion of the through-axle fork, when a bicycle is secured outside of a car.

DESCRIPTION OF PREFERRED EMBODIMENTS

Figure 1:
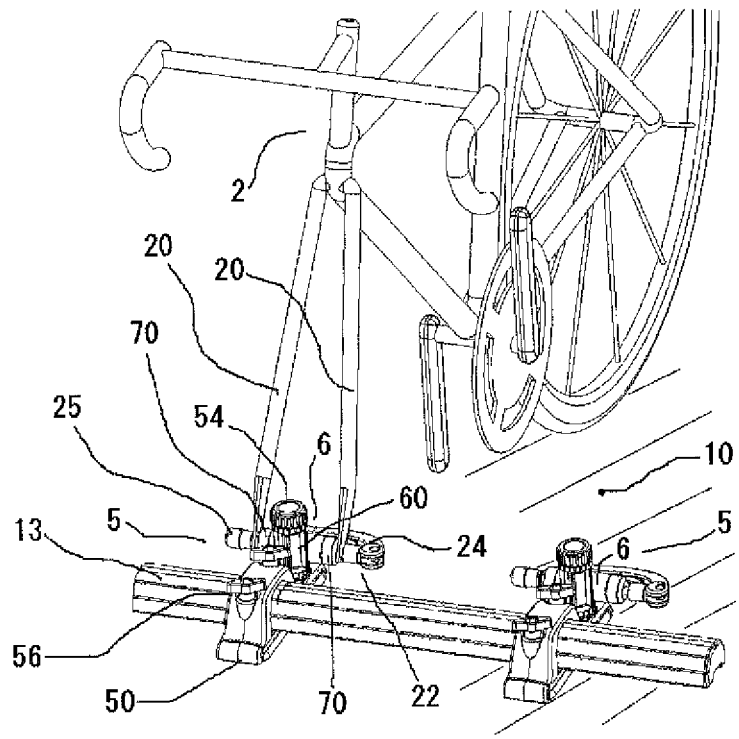
FIG. 1 is a reference perspective view illustrating a held state of a bicycle having conventional forks according to a first embodiment of the present invention.
Figure 2:
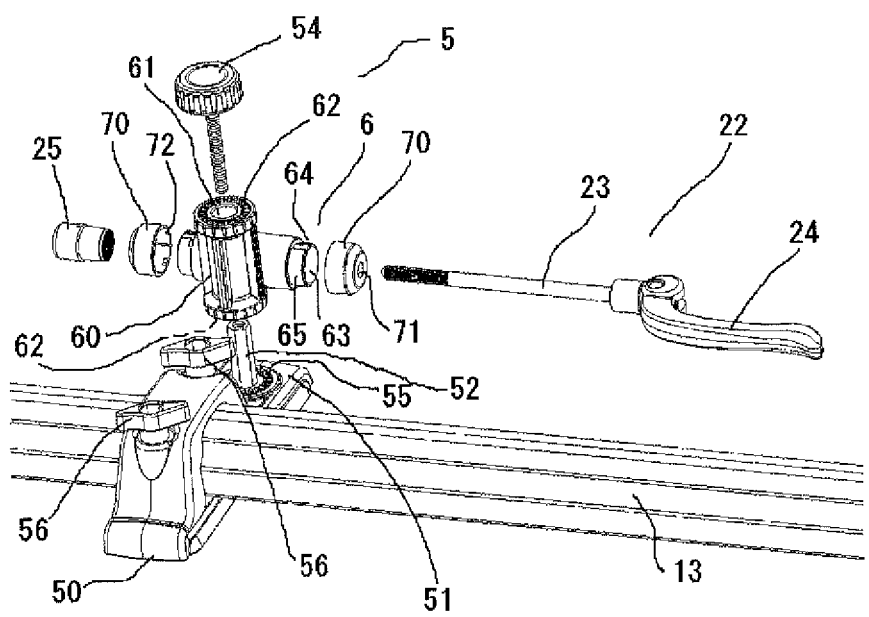
FIG. 2 is an exploded view when a conventional-fork-use supporting body is selected according to the first embodiment of the present invention.
Figure 3:
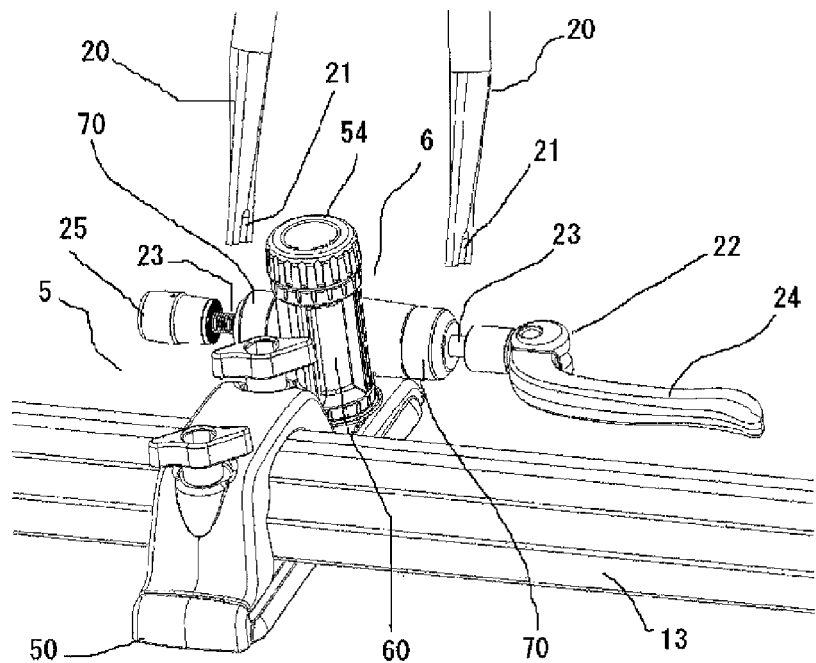
FIG. 3 is a reference perspective view illustrating a state before the conventional forks are mounted according to the first embodiment of the present invention.
Figure 4:
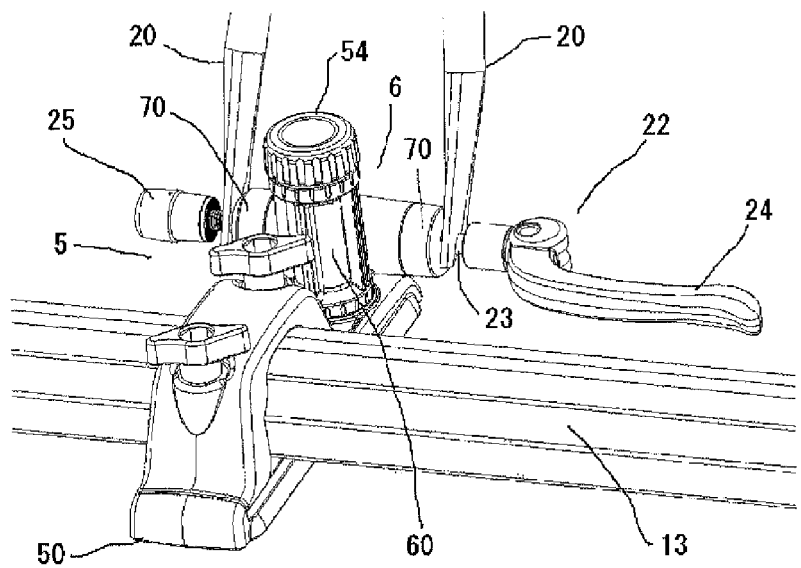
FIG. 4 is a reference perspective view illustrating a state after the conventional forks are mounted (before securement with a quick release skewer) according to the first embodiment of the present invention.
Figure 5:
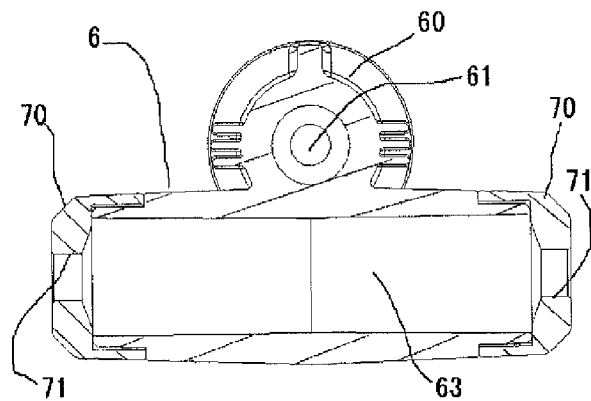
FIG. 5 is a reference cross-sectional view illustrating a coupled state between a support-device main body and the conventional-fork-use supporting body according to the first embodiment of the present invention.
Figure 6:
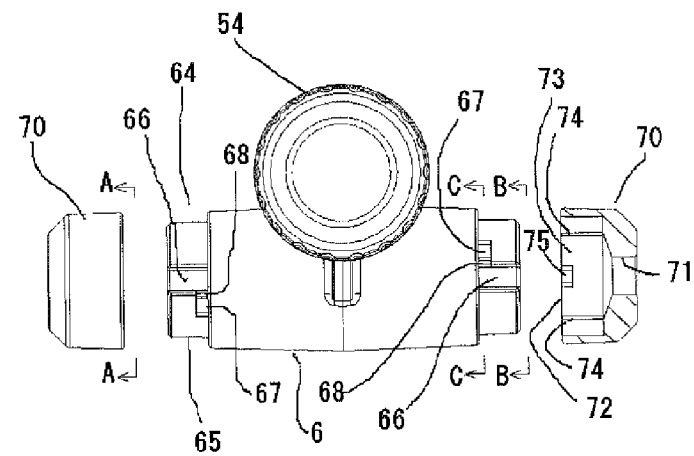
FIG. 6 is a reference plan view (partial cross-sectional view) for describing an engagement structure between the support-device main body and the conventional-fork-use supporting body according to the first embodiment of the present invention.
Figure 7:
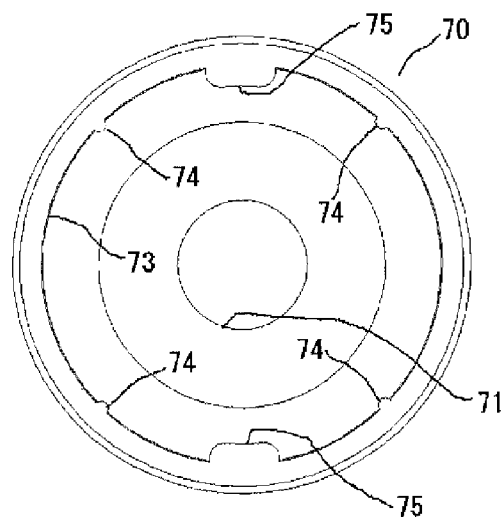
FIG. 7 is a side view viewed from the position of the line A-A in FIG. 6 according to the first embodiment of the present invention.
Figure 8:
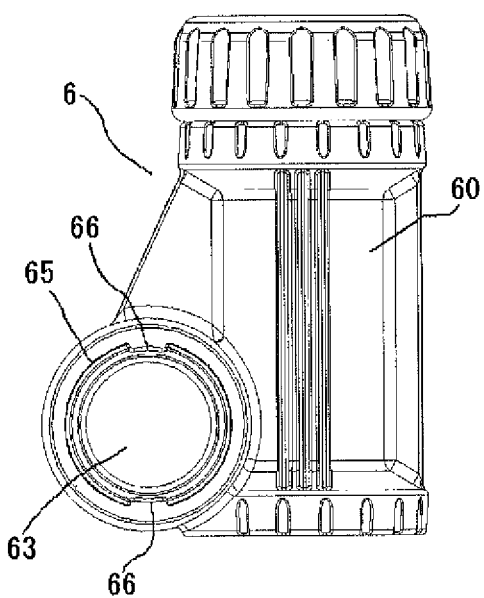
FIG. 8 is a side view viewed from the position of the line B-B in FIG. 6 according to the first embodiment of the present invention.
Figure 9:
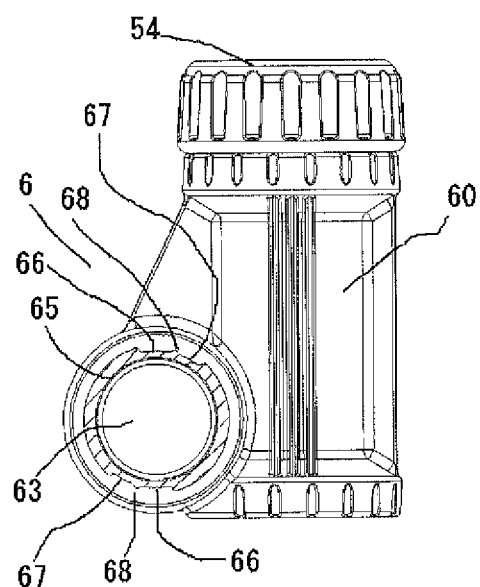
FIG. 9 is a cross-sectional view taken along the line C-C in FIG. 6 according to the first embodiment of the present invention.
Figure 10:
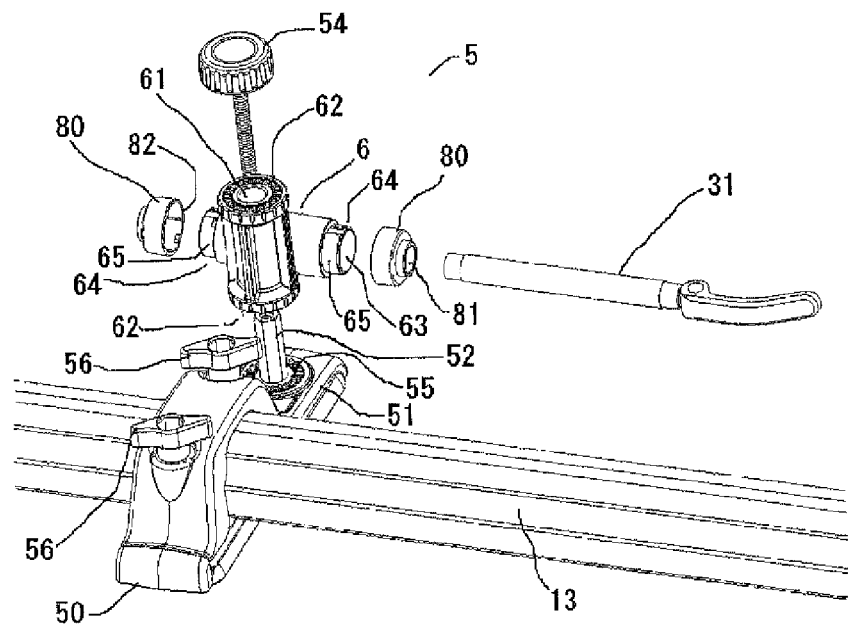
FIG. 10 is an exploded view when a shaft-diameter-15-mm through-axle-fork-use supporting body is selected according to the first embodiment of the present invention.
Figure 11:
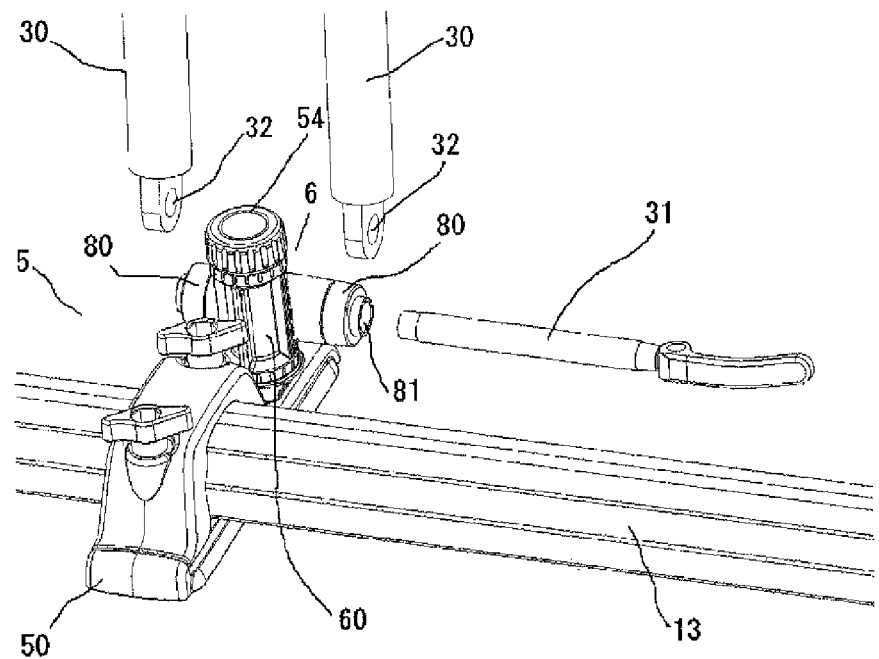
FIG. 11 is a reference perspective view illustrating a state before shaft-diameter-15-mm through-axle forks are mounted according to the first embodiment of the present invention.
Figure 12:
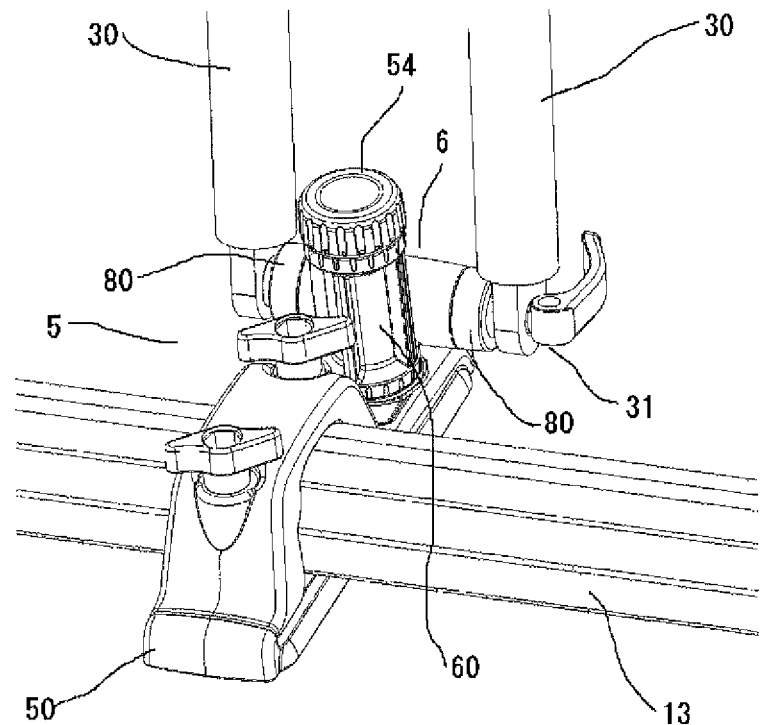
FIG. 12 is a reference perspective view illustrating a state after the shaft-diameter-15-mm through-axle forks are mounted according to the first embodiment of the present invention.
Figure 13:
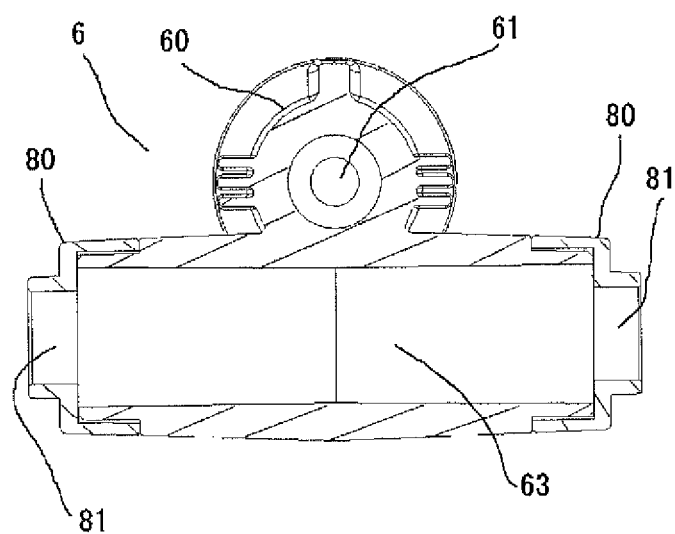
FIG. 13 is a reference cross-sectional view illustrating a coupled state between the support-device main body and the shaft-diameter-15-mm through-axle-fork-use supporting body according to the first embodiment of the present invention.
Figure 14:
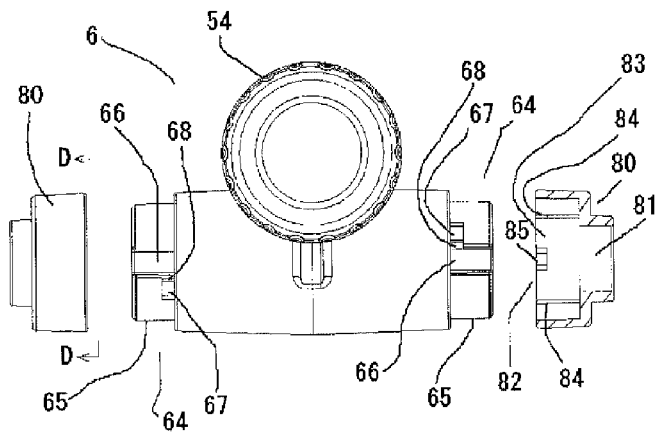
FIG. 14 is a reference plan view (partial cross-sectional view) for describing an engagement structure between the support-device main body and the shaft-diameter-15-mm through-axle-fork-use supporting body according to the first embodiment of the present invention.
Figure 15:
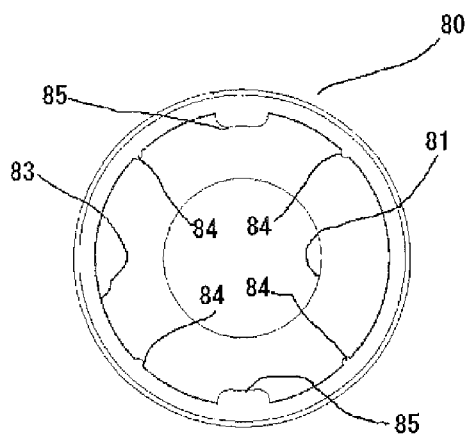
FIG. 15 is a side view viewed from the position of the line D-D in FIG. 14 according to the first embodiment of the present invention.
Figure 16:
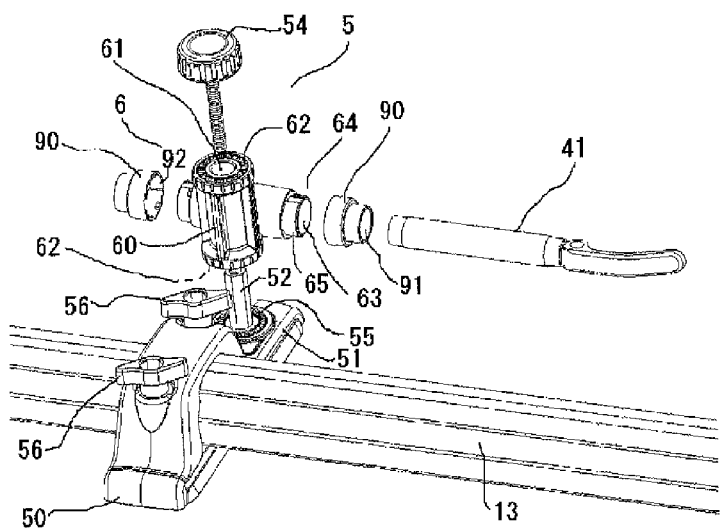
FIG. 16 is an exploded view when a shaft-diameter-20-mm through-axle-fork-use supporting body is selected according to the first embodiment of the present invention.
Figure 17:
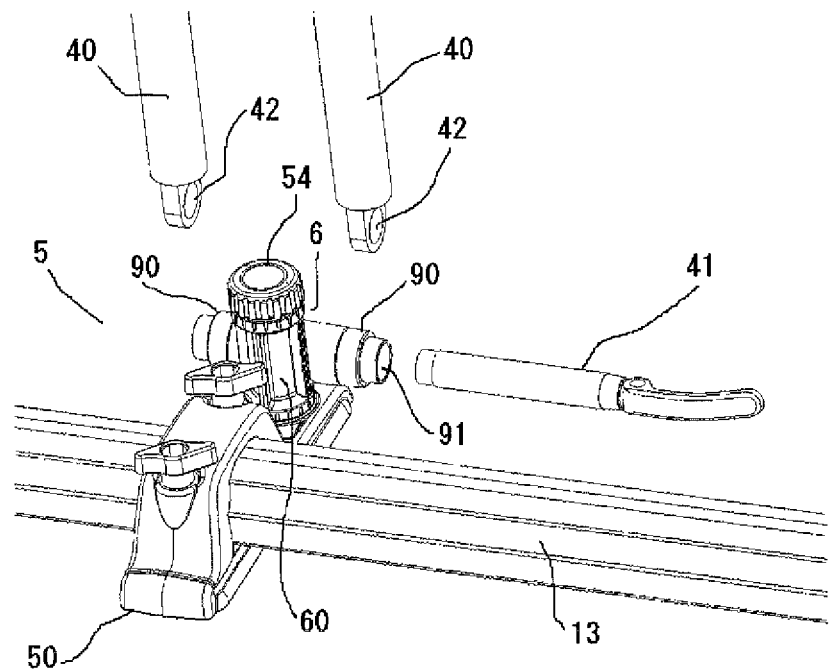
FIG. 17 is a reference perspective view illustrating a state before shaft-diameter-20-mm through-axle forks are mounted according to the first embodiment of the present invention.
Figure 18:
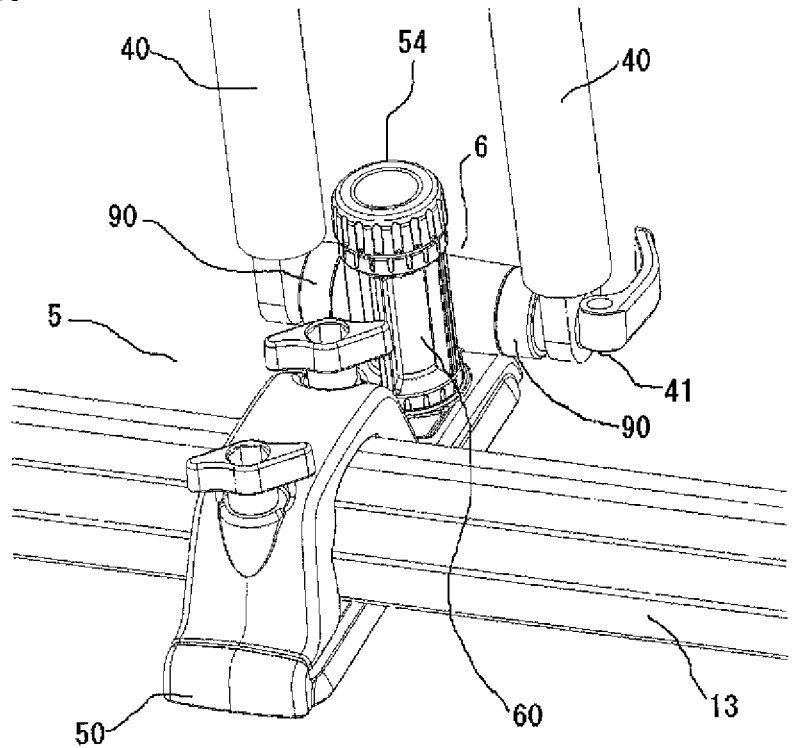
FIG. 18 is a reference perspective view illustrating a state after the shaft-diameter-20-mm through-axle forks are mounted according to the first embodiment of the present invention.
Figure 19:
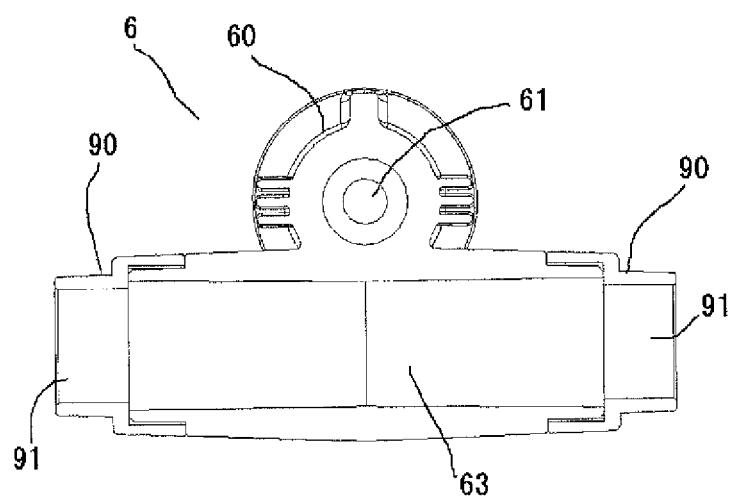
FIG. 19 is a reference cross-sectional view illustrating a coupled state between the support-device main body and the shaft-diameter-20-mm through-axle-fork-use supporting body according to the first embodiment of the present invention.
Figure 20:
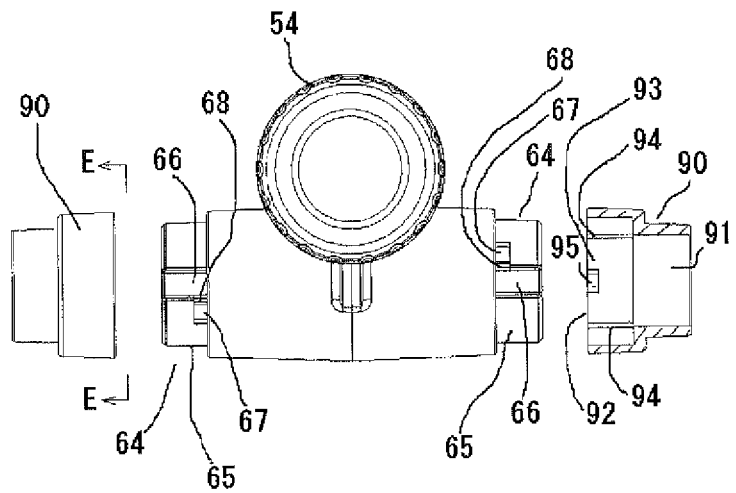
FIG. 20 is a reference plan view (partial cross-sectional view) for describing an engagement structure between the support-device main body and the shaft-diameter-20-mm through-axle-fork-use supporting body according to the first embodiment of the present invention.
Figure 21:
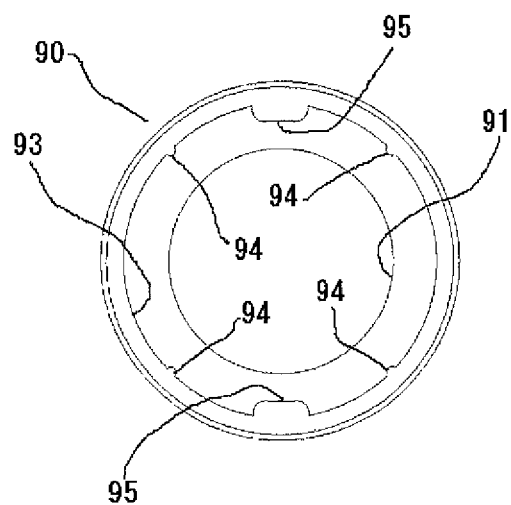
FIG. 21 is a side view viewed from the position of the line E-E in FIG. 20 according to the first embodiment of the present invention.

Hereinafter, embodiments of the present invention will be specifically described based on the drawings. Here, in the description of the present invention, the right-left direction means the direction across one end and the other end of a support shaft where a front wheel hub of a bicycle is supported on a fork.

Embodiment 1

FIG. 1 to FIG. 21 illustrate one example of a preferred embodiment of the present invention. The present invention is a fork support device 5, which removably secures the fork distal end portion of a bicycle 2 in a state where a front wheel hub is removed from a bicycle. The fork of the bicycle is classified roughly into: a conventional fork where an inverse U-shaped or C-shaped groove portion, which allows insertion of a support shaft of a quick release skewer, is formed in a lower end portion of the conventional fork; and a through-axle fork where a through-axle insertion hole for securing a through-axle hub is formed in a lower end portion of the through-axle fork. The present invention includes a support-fork switching unit configured to support: a conventional fork 20 where an inverse U-shaped or C-shaped groove portion 21, which allows insertion of a support shaft 23 of a quick release skewer 22 with a nominal diameter of 9 mm, is formed in a lower end portion of the conventional fork 20; a 15-mm through-axle fork 30 where an insertion hole 32 for a through axle 31 for securing a through-axle hub with a nominal diameter of 15 m is formed in a lower end portion of the 15-mm through-axle fork 30; and a 20-mm through-axle fork 40 where an insertion hole 42 for a through axle 41 for securing a through-axle hub with a nominal diameter of 20 in is formed in a lower end portion of the 20-mm through-axle fork 40.

The fork support device 5 has a base member 50 whose bottom portion has a contacting surface with an interior floor surface 10 of an automobile. At the position in the upper portion of the base member 50, a securing mechanism 56 using a screw unit with respect to a rail member 13 is disposed. The secured position of the base member 50 by the securing mechanism 56 can be adjusted in the longitudinal direction of the rail member 13. Further, at one side of the base member 50, an extending portion 51 is formed. At the extending portion 51, a securing unit, which secures a support-device main body 6, is constituted.

The securing unit for the support-device main body 6 with respect to the extending portion 51 has: a nut 52 secured to the extending portion 51, and a knob bolt 54 screwable to the nut 52 from the upper side.

The support-device main body 6 includes a tubular column portion 60 formed in the up-down direction. In the center portion of the tubular column portion 60, a vertical hole 61, which allows insertion of the bolt portion of the knob bolt 54, is formed. The tubular column portion 60 of the support-device main body 6 is sandwiched between the top surface of the extending portion 51 and the knob bolt 54.

Further, on the top surface of the extending portion 51 and the top and bottom surfaces of the tubular column portion 60, respective depression-protrusion portions 55 and 62 are formed. The depression-protrusion portions 55 and 62 are alternately arranged in a radial fashion with respect to the central axis of the knob bolt 54. When the tubular column portion 60 is sandwiched using the knob bolt 54, the depression-protrusion portion 55 on the top surface of the extending portion 51 and the depression-protrusion portion 62 on the bottom surface of the tubular column portion 60 engage with each other so as to prevent horizontal rotation of the support-device main body 6 with respect to the base member 50.

The support-device main body 6 includes a through hole 63, which has an inner diameter of 22 mm, formed in the right-left direction as a hollow portion that allows passage of all the support shaft 23 with a shaft diameter of 9 mm, the through axle 31 with a shaft diameter of 15 mm, and the through axle 41 with a shaft diameter of 20 mm. At the positions of the right and left end portions of the through hole 63, respective end portions 64 with an outer diameter of 26 mm are formed to protrude in a cylindrical shape.

Here, the end portions 64 are formed at the positions offset to the vertical center position of the tubular column portion 60. When the support-device main body 6 is secured to the extending portion 51, the end portions 64 can be secured in vertically inverted positions as necessary so as not to interfere with the shape of the fork or the attachment such as a disc brake of the bicycle to be mounted.

As the support-fork switching unit, supporting bodies are configured to be attachable and removable with respect to the right and left end portions 64 of the through hole 63. For the supporting body, a pair of conventional-fork-use supporting bodies 70, a pair of shaft-diameter-15-mm through-axle-fork-use supporting bodies 80, and a pair of shaft-diameter-20-mm through-axle-fork-use supporting bodies 90 are prepared in advance. At one end of the conventional-fork-use supporting body 70, there is formed a contacting portion 71 (the contacting portion may have an inner diameter larger than 9.1 mm, and the inner surface of the contacting portion may form a rib-shaped portion that supports the support shaft 23 with a shaft diameter of 9 mm), which has an inner diameter of 9.1 mm and supports the support shaft 23 with a shaft diameter of 9 mm. At one end of the shaft-diameter-15-mm through-axle-fork-use supporting body 80, there is formed a contacting portion 81 (the contacting portion may have an inner diameter larger than 15.1 mm, and the inner surface of the contacting portion may form a rib-shaped portion that supports the through axle 31 with a shaft diameter of 15 mm), which has an inner diameter of 15.1 mm and supports the through axle 31 with a shaft diameter of 15 mm. At one end of the shaft-diameter-20-mm through-axle-fork-use supporting body 90, there is formed a contacting portion 91 (the contacting portion may have an inner diameter larger than 20.1 mm, and the inner surface of the contacting portion may form a rib-shaped portion that supports the through axle 41 with a shaft diameter of 20 mm), which has an inner diameter of 20.1 mm and supports the through axle 41 with a shaft diameter of 20 mm. Here, in the shaft-diameter-20-mm through-axle-fork-use supporting bodies 90, the right and left contacting portions 91 are formed to have respective positions longer by about 5 mm in the right-left direction than those of the other supporting bodies.

As a unit for removably mounting the supporting bodies 70, 80, or 90 on the right and left end portions 64 of the support-device main body 6, end-portion mounting portions 72, 82, or 92 are formed on the inner peripheral surfaces at the other end side of the supporting bodies 70, 80, or 90. The end-portion mounting portions 72, 82, or 92 are mountable on respective cylindrical outer peripheral portions 65 formed in the right and left end portions 64 of the support-device main body 6. The end-portion mounting portion 72, 82, or 92 is formed to have an inner peripheral surface 73, 83, or 93, which is formed in a concentric circle with an inner diameter of 28 mm, and four ribs 74, 84, or 94, which are equally spaced on this inner peripheral surface. In this formation, the distance between the distal ends of the facing ribs is approximately equal to the outer diameters of the cylindrical outer peripheral portions 65 in the right and left end portions 64 of the support-device main body 6. Here, in this embodiment, without forming the ribs 74, 84, or 94, the inner diameters of the inner peripheral surfaces 73, 83, or 93 may be formed to be inner diameters slightly larger than the outer diameters of the cylindrical outer peripheral portions 65 in the right and left end portions 64 of the support-device main body 6.

Further, in this embodiment, in the cylindrical outer peripheral portions 65 of the right and left end portions 64 of the support-device main body 6, a pair of respective guide grooves 66 is formed. The guide groove 66 extends in the right-left direction (the axial direction) from the edge portion toward the far portion. The guide grooves 66 are in communication with respective locking grooves 67 in the far portion. The locking groove 67 is formed in the end portion along the circumferential direction. In the edge portion of the inner surface of the end-portion mounting portion 72, 82, or 92 in the supporting body 70, 80, or 90, a pair of engaging protrusions 75, 85, or 95 is formed. When the supporting body 70, 80, or 90 is mounted on the end portion 64 of the support-device main body 6, the engaging protrusion 75, 85, or 95 enters the inside of the guide groove 66 and the locking groove 67, which are formed in the end portion 64.

Further, at the boundary of the pair of locking grooves 67 with the guide grooves 66, a pair of shallow groove portions 68 is formed. The shallow groove portions 68 have an inter-groove distance larger than the distance between the distal ends of the pair of engaging protrusions 75, 85, or 95 formed in the end-portion mounting portion 72, 82, or 92.

With the above-described configuration, when the supporting body 70, 80, or 90 is mounted on the end portion 64 of the support-device main body 6, in the state where the position of the locking groove 67 and the position of the engaging protrusion 75, 85, or 95 are matched together, the supporting body 70, 80, or 90 is moved toward the center in the right-left direction in the support-device main body 6. At the time point when the engaging protrusion 75, 85, or 95 reaches the position at the far side of the guide groove 66, the supporting body 70, 80, or 90 is rotated in the direction in which the engaging protrusion 75, 85, or 95 enters the locking groove 67 so as to engage the locking groove 67 and the engaging protrusion 75, 85, or 95 with each other. Accordingly, if the force in the direction separating from the support-device main body 6 is applied to the supporting body 70, 80, or 90, the supporting body 70, 80, or 90 is not removed from the support-device main body 6.

Further, in the portion adjacent to the guide grooves 66 in the pair of locking grooves 67, the pair of shallow groove portions 68, which is formed to have an inter-groove distance slightly larger than the distance between the distal ends of the pair of engaging protrusions 75, 85, or 95 formed in the end-portion mounting portion 72, 82, or 92, is arranged. Accordingly, in the state where the supporting body 70, 80, or 90 is mounted on the end portion 64 of the support-device main body 6 to engage the far portion of the locking groove 67 and the engaging protrusion 75, 85, or 95 with each other, even in the case where the rotational force in the direction in which the engaging protrusion 75, 85, or 95 becomes closer to the guide groove 66 is applied to the supporting body 70, 80, or 90, the engaging protrusion 75, 85, or 95 does not rotate and move up to the position of the guide groove 66 principally unless the end-portion mounting portion 72, 82, or 92 elastically deforms such that the engaging protrusion 75, 85, or 95 climbs over the shallow groove portion 68.

Here, a unit for removably mounting any of the respective supporting bodies according to the present invention on the right and left end portions is not limited to this embodiment. For example, the respective counts of the formed guide grooves, locking grooves, shallow groove portions, and protrusions may be one, or equal to or more than three. Further, the engaging protrusion may be formed on the outer peripheral surface of the end portion, and the guide groove, the locking groove, and the shallow groove portion may be formed on the inner surface of the end-portion mounting portion to fit the engaging protrusion (not illustrated).

In the first embodiment, the description is given of the configuration in the case where the fork support device 5 is used to be secured to the rail member 13, which is arranged in contact with the top surface of the loading floor surface 10 formed in the interior of an automobile. The fork support device 5 may be secured to the roof of an automobile or a carrier bar secured to the back of an automobile, and the fork support device according to the present invention may be used to be secured to the location (for example, another vehicle or at home) other than the automobile.

Embodiment 2

Figure 22:
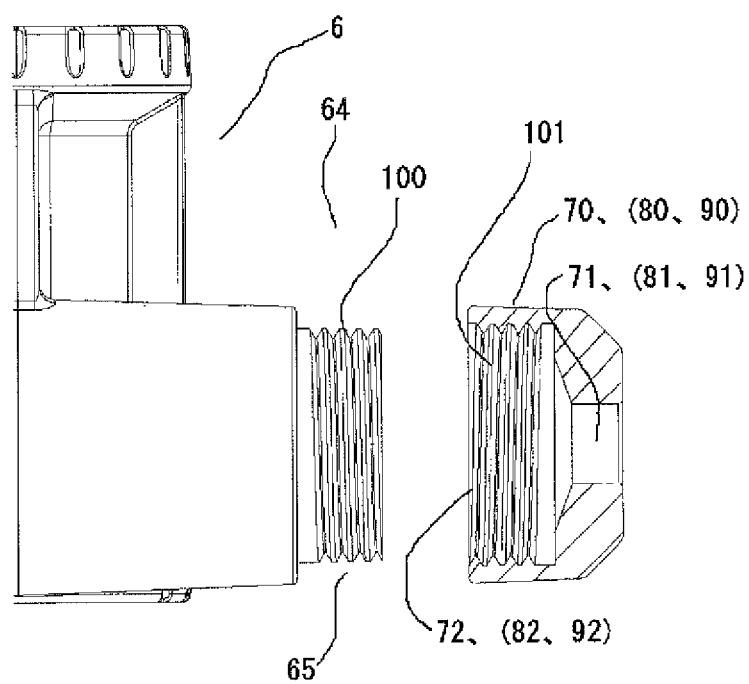
FIG. 22 is a main-part reference diagram according to a second embodiment of the present invention.

FIG. 22 illustrates one example of a preferred embodiment of the present invention. According to this embodiment, for example, a screw portion 100 may be formed in the cylindrical outer peripheral portion 65 of the end portion 64 in the support-device main body 6 described in the first embodiment. Additionally, a nut portion 101, which is threadably mounted on the screw portion 100 formed in the cylindrical outer peripheral portion 65 of the end portion 64, may be formed on the inner peripheral surface 73, 83, or 93 of the end-portion mounting portion 72, 82, or 92 of the supporting body 70, 80, or 90 described in the first embodiment.

Figure 23:
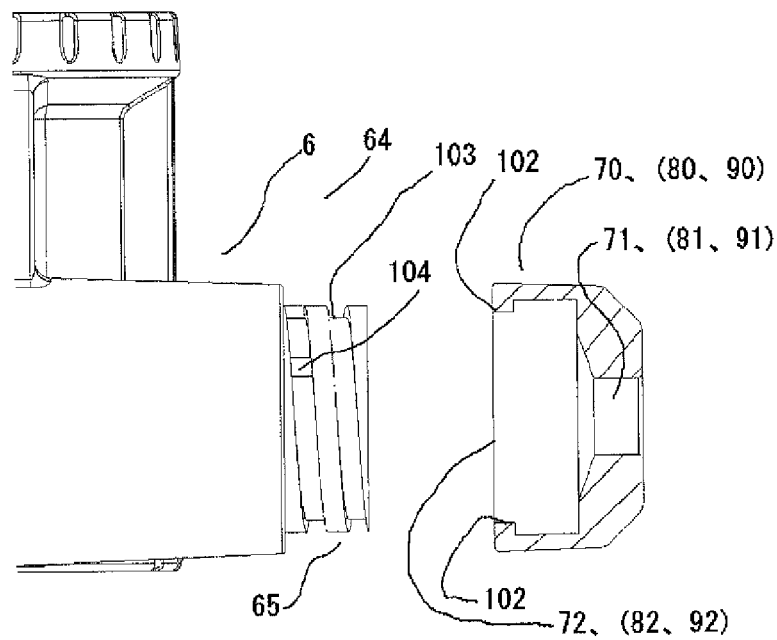
FIG. 23 is a main-part reference diagram illustrating a modification according to the second embodiment of the present invention.
Figure 24:
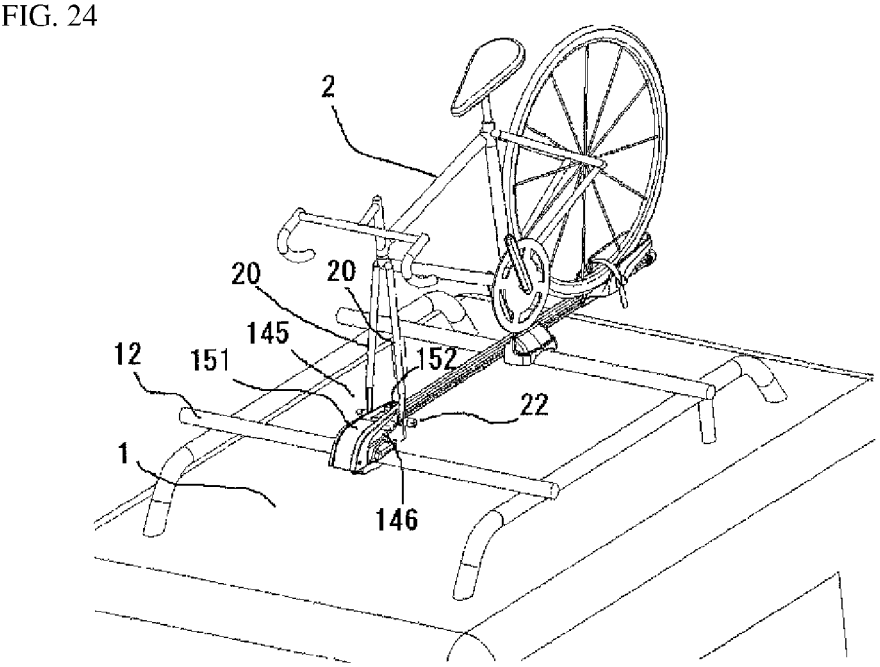
FIG. 24 is a reference perspective view illustrating a held state of a bicycle having the conventional forks according to a third embodiment of the present invention.
Figure 25:
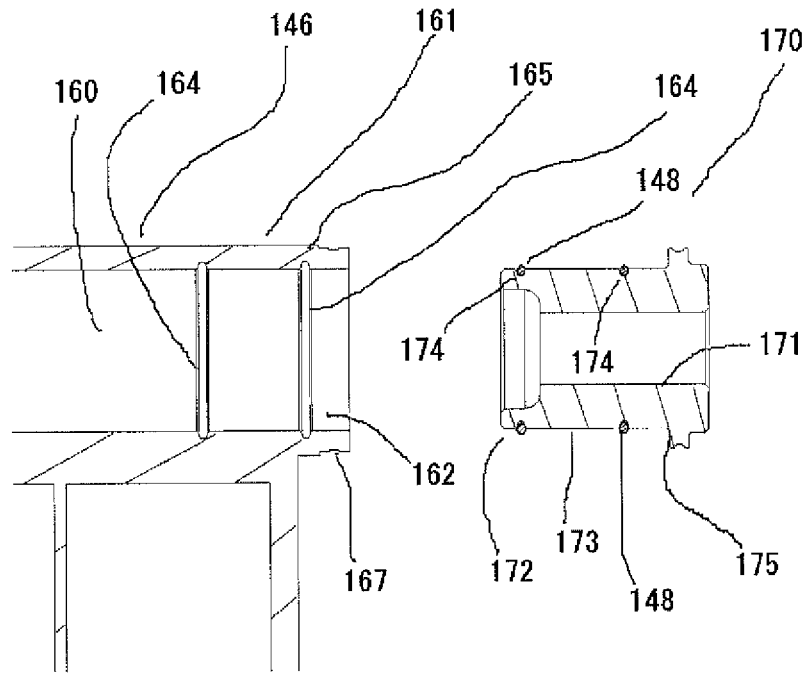
FIG. 25 is a reference cross-sectional view illustrating the relationship of a conventional-fork-use supporting body to a support-device main body according to the third embodiment of the present invention.
Figure 26:
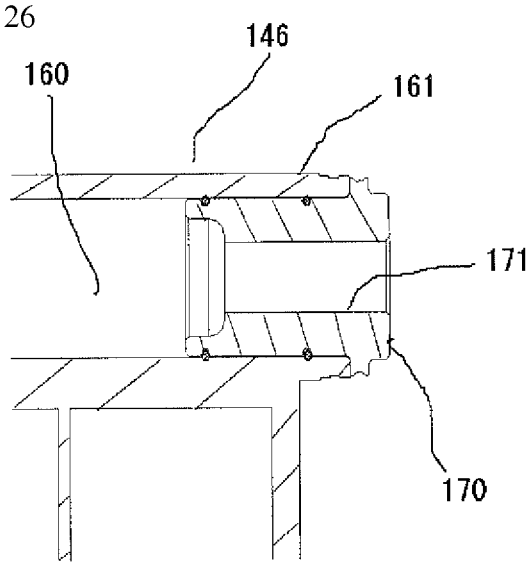
FIG. 26 is a reference cross-sectional view illustrating a mounted state of the conventional-fork-use supporting body on the support-device main body according to the third embodiment of the present invention.
Figure 27:
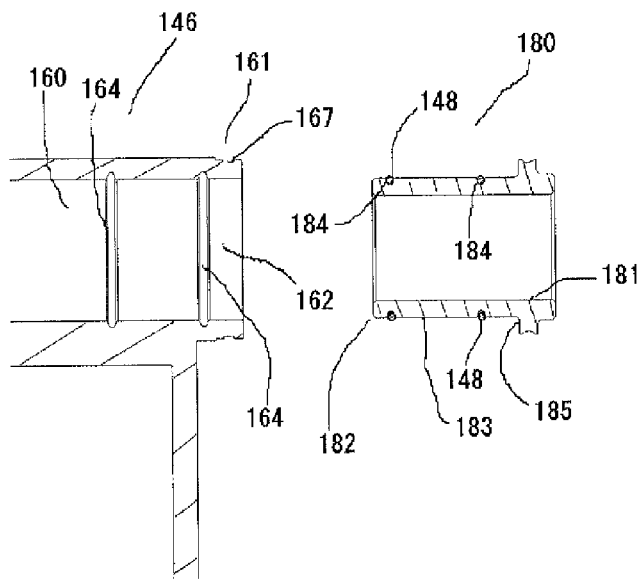
FIG. 27 is a reference cross-sectional view illustrating the relationship of a shaft-diameter-15-mm through-axle-fork-use supporting body to the support-device main body according to the third embodiment of the present invention.
Figure 28:
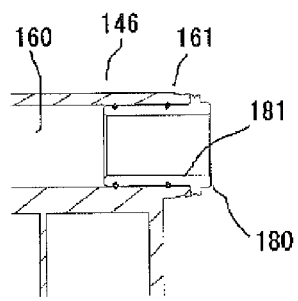
FIG. 28 is a reference cross-sectional view illustrating a mounted state of the shaft-diameter-15-mm through-axle-fork-use supporting body on the support-device main body according to the third embodiment of the present invention.
Figure 29:
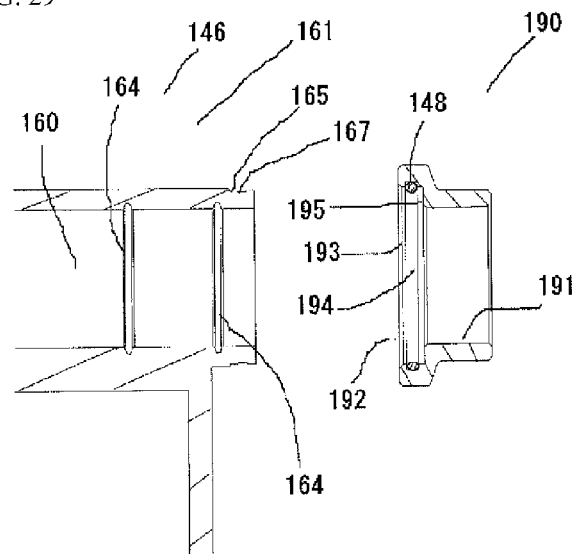
FIG. 29 is a reference cross-sectional view illustrating the relationship of a shaft-diameter-20-mm through-axle-fork-use supporting body to the support-device main body according to the third embodiment of the present invention.
Figure 30:
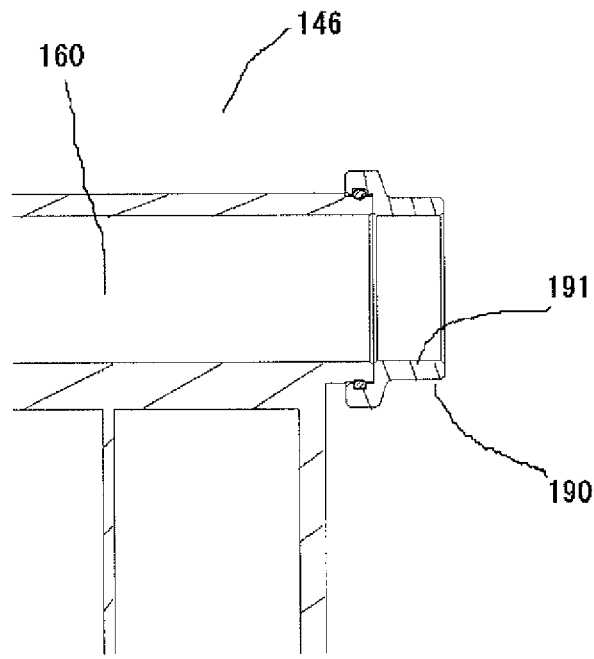
FIG. 30 is a reference cross-sectional view illustrating a mounted state of the shaft-diameter-20-mm through-axle-fork-use supporting body on the support-device main body according to the third embodiment of the present invention.

Further, as a modification of this embodiment, in FIG. 23, the unit for removably mounting any of the respective supporting bodies 70, 80, and 90 according to the present invention on the right and left end portions 64 of the support-device main body 6 is not limited to this embodiment. For example, a pair of facing protrusions 102 may be formed in the edge portion of the inner peripheral surface 73, 83, or 93 of the end-portion mounting portion 72, 82, or 92 in the supporting body 70, 80, or 90 so as to be threadably mounted on a spiral two groove 103 formed in the cylindrical outer peripheral portion 65 of the end portion 64. At this time, a pair of shallow groove portions 104, which is formed to have an inter-groove distance slightly larger than the distance between the distal ends of the pair of protrusions 102 in the middle of the two groove 103, may be formed such that, in the state where the supporting body 70, 80, or 90 is mounted on the end portion 64 of the support-device main body 6 to threadably mount the protrusions 102 on the two groove 103, even in the case where the rotational force in the direction removed from the support-device main body 6 is applied to the supporting body 70, 80, or 90, the friction resistance of the shallow groove portion 104 against the protrusion 102 does not loosen the threadably mounted condition. Further, the spiral groove is not limited to the two groove and may be, for example, a one groove or a three or more groove may be formed. Furthermore, protrusions may be disposed on the cylindrical outer peripheral portion 65 of the end portion 64, and a groove may be disposed on the inner peripheral surface 73, 83, or 93 of the end-portion mounting portion 72, 82, or 92 (not illustrated).

Embodiment 3

FIG. 24 to FIG. 37 illustrate one example of a preferred embodiment of the present invention. This embodiment is a fork support device 145, which removably secures the fork distal end portion of a bicycle in a state where a front wheel hub is removed from the bicycle 2. The fork of the bicycle is classified roughly into: a conventional fork where an inverse U-shaped or C-shaped groove portion, which allows insertion of a support shaft of a quick release skewer with a nominal diameter of 9 mm, is formed in a lower end portion of the conventional fork; and a through-axle fork where a through-axle insertion hole for securing a through-axle hub is formed in a lower end portion of the through-axle fork. The present invention includes a support-fork switching unit configured to support: the conventional fork 20 where the inverse U-shaped or C-shaped groove portion 21, which allows insertion of the support shaft 23 of the quick release skewer 22 with a nominal diameter of 9 mm, is formed in a lower end portion of the conventional fork 20; the 15-mm through-axle fork 30 where the insertion hole 32 for the through axle 31 for securing a through-axle hub with a nominal diameter of 15 mm is formed in a lower end portion of the 15-mm through-axle fork 30; and the 20-mm through-axle fork 40 where the insertion hole 42 for the through axle 41 for securing a through-axle hub with a nominal diameter of 20 mm is formed in a lower end portion of the 20-mm through-axle fork 40.

The fork support device 145 includes a through hole 160 formed in the right-left direction as a hollow portion that allows passage of all the support shaft 23 with a shaft diameter of 9 mm, the through axle 31 with a shaft diameter of 15 mm, and the through axle 41 with a shaft diameter of 20 mm. The fork support device 145 includes a support-device main body 146. In the support-device main body 146, at the positions of the right and left end portions of the through hole 160, respective end portions 161 with an outer diameter of 25.5 mm and an inner diameter of 20.2 mm are formed to protrude in a cylindrical shape.

As the support-fork switching unit, supporting bodies are configured to be attachable and removable with respect to the end portions 161 formed in positions of the right and left end portions of the through hole 160. For the supporting body, a pair of conventional-fork-use supporting bodies 170, a pair of shaft-diameter-15-mm through-axle-fork-use supporting bodies 180, and a pair of shaft-diameter-20-mm through-axle-fork-use supporting bodies 190 are prepared in advance. At one end of the conventional-fork-use supporting body 170, there is formed a contacting portion 171 (the contacting portion may have an inner diameter larger than 9.1 mm, and the inner surface of the contacting portion may form a rib-shaped portion that supports the support shaft 23 with a shaft diameter of 9 mm), which has an inner diameter of 9.1 mm and supports the support shaft 23 with a shaft diameter of 9 mm. At one end of the shaft-diameter-15-mm through-axle-fork-use supporting body 180, there is formed a contacting portion 181 (the contacting portion may have an inner diameter larger than 15.1 mm, and the inner surface of the contacting portion may form a rib-shaped portion that supports the through axle 31 with a shaft diameter of 15 mm), which has an inner diameter of 15.1 mm and supports the through axle 31 with a shaft diameter of 15 mm. At one end of the shaft-diameter-20-mm through-axle-fork-use supporting body 190, there is formed a contacting portion 191 (the contacting portion may have an inner diameter larger than 20.1 mm, and the inner surface of the contacting portion may form a rib-shaped portion that supports the through axle 41 with a shaft diameter of 20 mm), which has an inner diameter of 20.1 mm and supports the through axle 41 with a shaft diameter of 20 mm.

As a unit for removably mounting the conventional-fork-use supporting bodies 170 or the shaft-diameter-15-mm through-axle-fork-use supporting bodies 180 on the right and left end portions 161 of the support-device main body 146, end-portion inserting portions 172 or 182 are formed on outer peripheral surfaces 173 or 183 at the other end side of the supporting bodies 170 or 180. The end-portion inserting portions 172 or 182 are insertable into respective cylindrical inner peripheral portions 162 formed in the end portions 161.

The outer peripheral surface 173 or 183 of the end-portion inserting portion 172 or 182 is formed in a concentric circle with an outer diameter of 20 mm. On the circumference of the outer peripheral surface 173 or 183, groove portions 174 or 184 are formed. In the groove portion 174 or 184, a ring-shaped elastic body 148 is arranged. Additionally, in the outer peripheral position of the supporting body 170 or 180 adjacent to the end-portion inserting portion 172 or 182, a flange portion 175 is formed. The flange portion 175 or 185 makes contact with the distal end portion of the end portion 161 in the mounted state of the supporting body 170 or 180 on the end portion 161.

In this embodiment, in the state where the ring-shaped elastic body 148 is mounted within the groove portion 174 or 184, the outer diameter of the ring-shaped elastic body 148 is set to 21 mm. When the end-portion inserting portion 172 or 182 is inserted into the cylindrical inner peripheral portion 162, the ring-shaped elastic body 148 deforms as a friction member so as to cause friction resistance to the relative movement of the end-portion inserting portion 172 or 182 with respect to the cylindrical inner peripheral portion 162. This prevents the supporting body from being carelessly moved and dropped off during exchanging work of the supporting bodies or during securing work of the fork of the bicycle. Further, in the mounted state of the supporting body 170 or 180 on the end portion 161, a groove portion 164 is formed on the inner peripheral surface of the cylindrical inner peripheral portion 162 corresponding to the arrangement position of the ring-shaped elastic body 148 mounted on the end-portion inserting portion 172 or 182. Accordingly, in the state where the supporting body 170 or 180 is mounted on the end portion 161, the end portion 161 and the supporting body 170 or 180 can engage with each other via the ring-shaped elastic body 148.

As a unit for removably mounting the shaft-diameter-20-mm through-axle-fork-use supporting bodies 190 on the right and left end portions 161 of the support-device main body 146, end-portion mounting portions 192 are formed on inner peripheral surfaces 193 at the other end side of the supporting bodies 190. The end-portion mounting portions 192 are mountable on respective cylindrical outer peripheral portions 165 formed in the end portions 161.

The end-portion mounting portion 192 is constituted of the inner peripheral surface 193, which is formed in a concentric circle with an inner diameter of 26.1 mm, a groove portion 194, which is formed on the circumference of the inner peripheral surface 193, and the ring-shaped elastic body 148, which is arranged in the groove portion 194. Additionally, in the inner peripheral position of the supporting body 190 adjacent to the end-portion mounting portion 192, a stepped portion 195 is formed. The stepped portion 195 makes contact with the distal end portion of the end portion 161 in the mounted state of the supporting body 190 on the end portion 161.

In this embodiment, in the state where the ring-shaped elastic body 148 is mounted within the groove portion 194, the inner diameter of the ring-shaped elastic body 148 is set to 25.1 mm. When the end-portion mounting portion 192 is mounted on the cylindrical outer peripheral portion 165, the ring-shaped elastic body 148 deforms as a friction member so as to cause friction resistance to the relative movement of the end-portion mounting portion 192 with respect to the cylindrical outer peripheral portion 165. This prevents the supporting body 190 from being carelessly moved and dropped off during exchanging work of the supporting bodies or during securing work of the fork of the bicycle. Further, in the mounted state of the supporting body 190 on the end portion 161, the groove portion 167 is formed on the outer peripheral surface of the cylindrical outer peripheral portion 165 corresponding to the arrangement position of the ring-shaped elastic body 148 of the end-portion mounting portion 192. Accordingly, in the state where the supporting body 190 is mounted on the end portion 161, the end portion 161 and the supporting body 190 can engage with each other via the ring-shaped elastic body 148.

Here, as a unit for engaging the supporting body 190 with the end portion 161 in this embodiment, the structures described in Embodiment 1 to Embodiment 3 may be used instead of the use of the ring-shaped elastic body. Another existing engaging unit may be used.

The friction unit described in Embodiment 3 may be used between the end portion 64 described in Embodiment 1 to Embodiment 2 and the supporting body 70, 80, or 90. Another existing friction unit may be used.

Here, the shapes of the end portions 64 and 161 in the support-device main bodies 6 and 146 according to the present invention are not limited to the cylindrical shape as a concentric circle disclosed in the respective embodiments, and may be a polygonal shape formed as a combination of ellipses, planar surfaces or arcs. Similarly, the shape inside the end-portion mounting portion of the supporting body is not limited to the cylindrical shape as a concentric circle, and may be a polygonal shape formed as a combination of ellipses, planar surfaces or arcs.

In the present invention, the support-fork switching unit may be configured to fit a through axle with a shaft diameter other than shaft diameters of 15 mm and 20 mm of the through-axle hubs. For example, to fit the through axle with a shaft diameter of 24 mm, as the hollow portion, which allows passage of the through axle with a shaft diameter of 24 mm, of the support-device main body, for example, a through hole with an inner diameter of 25 mm is form in the right-left direction. In the right and left end portions of the through hole, respective open end portions with an outer diameter of 30 mm are formed to protrude in a cylindrical shape. For the supporting body, in addition to the conventional-fork-use supporting body, the shaft-diameter-15-mm through-axle-fork-use supporting body, and the shaft-diameter-20-mm through-axle-fork-use supporting body, a pair of shaft-diameter-24-mm through-axle-fork-use supporting bodies is prepared in advance. At one end of the shaft-diameter-24-mm through-axle-fork-use supporting body, there is formed a contacting portion, which has an inner diameter of 24.1 mm to support the through axle with a shaft diameter of 24 mm. In the respective supporting bodies, the open-end-portion mounting portion is mountable on the open end portion with an outer diameter of 30 mm. This configuration is preferred.

Figure 31:
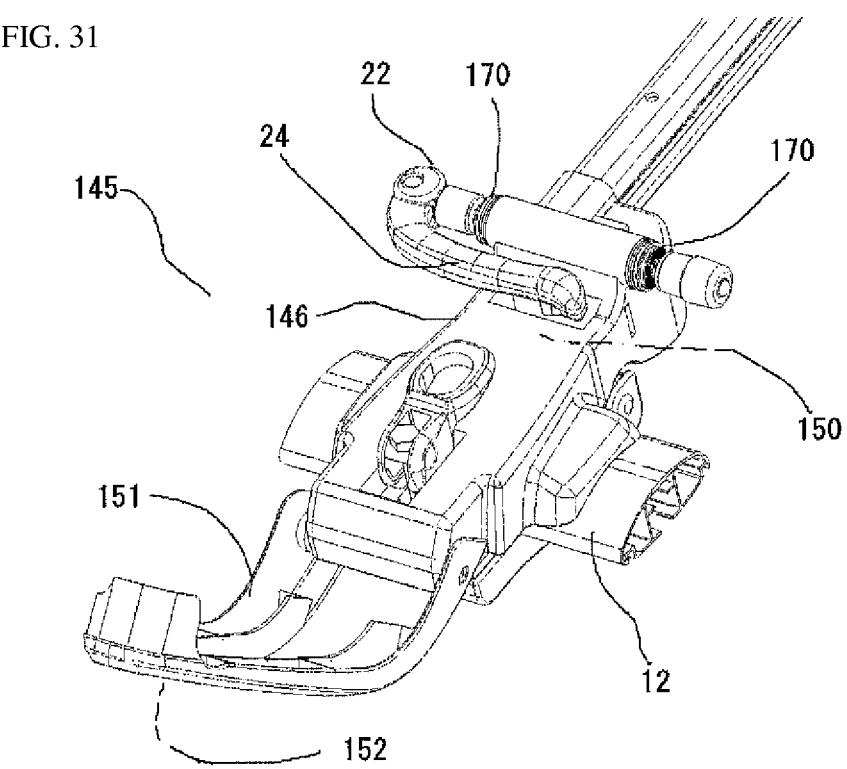
FIG. 31 is a reference perspective view of illustrating a state before the conventional forks are mounted according to the third embodiment of the present invention.

Here, regarding the fork support device 145 for the bicycle according to this embodiment, as illustrated in FIG. 31, a space portion 150 is formed to allow arranging a lever portion 24 of the quick release skewer 22 on the top surface of the support-device main body 146. In the upper portion of the support-device main body 146, a cover member 151, which covers the top surface of the space portion 150, is arranged. On the cover member 151, a key mechanism 152 is mounted. The key mechanism 152 is configured to control opening and closing of the cover member 151 with respect to the support-device main body 146.

One end of the cover member 151 is openably and closably coupled to the support-device main body 146 by a hinge mechanism. In the state where the cover member 151 is opened, the lever portion 24 of the quick release skewer 22 can be arranged in the space portion 150, which is formed on the top surface of the support-device main body 146. In the state where the cover member 151 is closed, it is difficult to take out the lever portion 24 of the quick release skewer 22 from the space portion 150. This configuration prevents the situation where a third person operates the lever portion 24 of the quick release skewer 22 so as to steal the bicycle.

Figure 32:
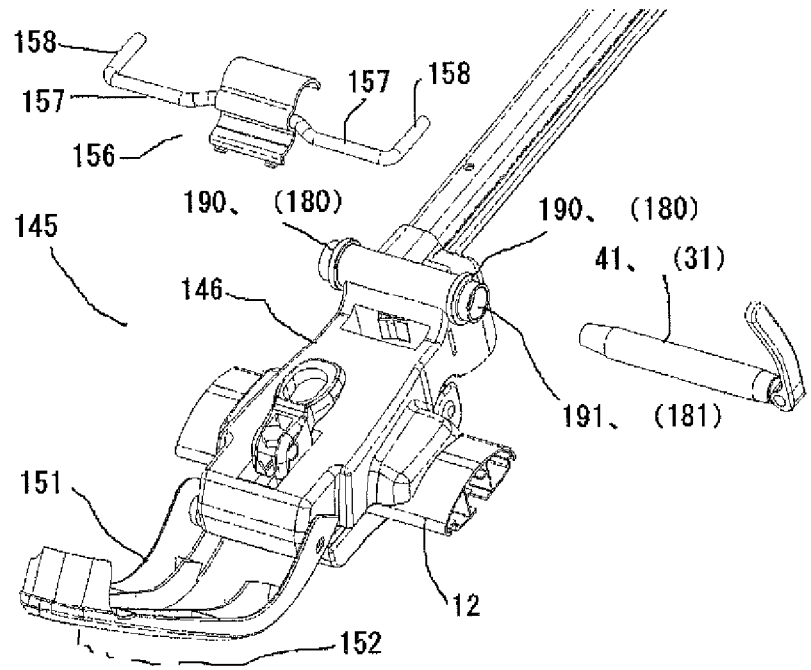
FIG. 32 is an exploded view when the shaft-diameter-20-mm through-axle-fork-use supporting body is selected according to the third embodiment of the present invention.
Figure 33:
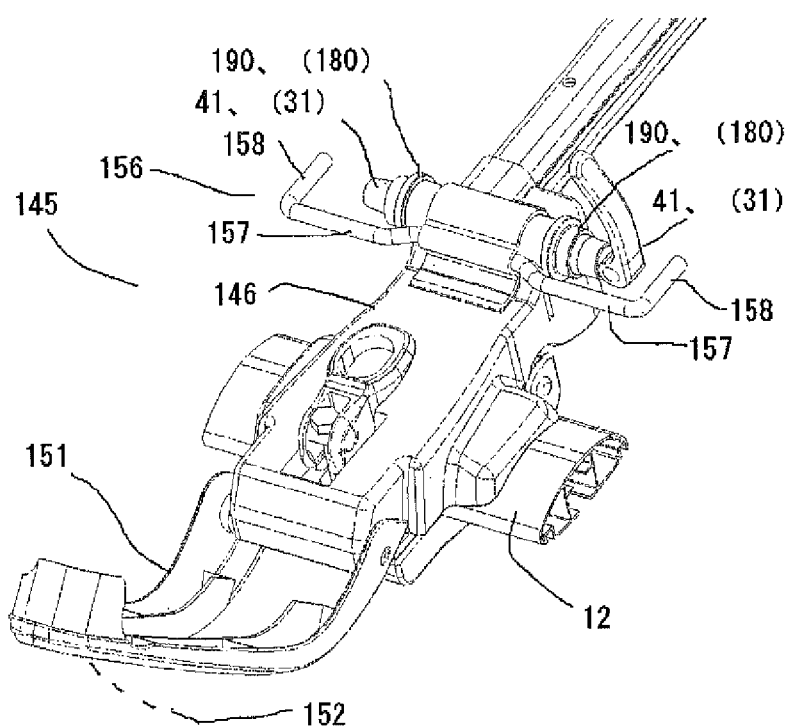
FIG. 33 is a reference perspective view illustrating a state before the shaft-diameter-20-mm through-axle forks are mounted according to the third embodiment of the present invention.
Figure 34:
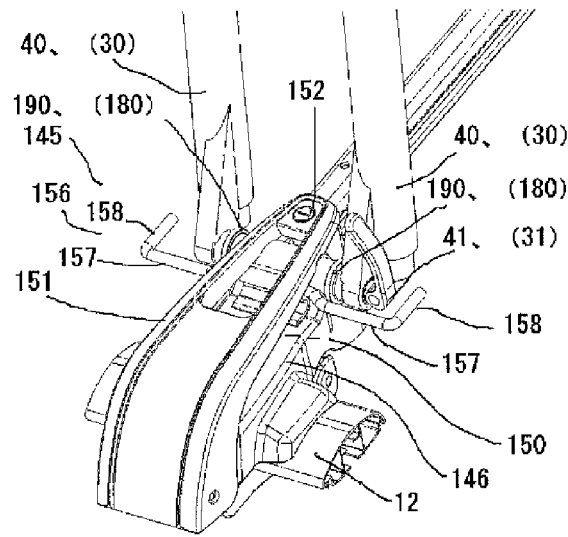
FIG. 34 is a reference perspective view illustrating a state after the shaft-diameter-20-mm through-axle fork is mounted according to the third embodiment of the present invention.

Further, in this embodiment, as illustrated in FIG. 32 to FIG. 34, to prevent the situation where a third person pulls out the through axle 31 or 41 securing the through-axle fork 30 or 40 so as to steal the bicycle, a guarding member 156 can be arranged between the top surface of the support-device main body 146 and the cover member 151.

The guarding member 156 is secured between the support-device main body 146 and the cover member 151 in the state where the cover member 151 is closed with respect to the support-device main body 146, and is attachable and removable in the state where the cover member 151 is opened with respect to the support-device main body 146.

The guarding member 156 includes an arm portion 157 (may be formed on the right side or the left side), which extends in the right-left direction of the guarding member 156 in the state mounted on the support-device main body 146, and a guarding portion 158, which prevents the through axle 31 or 41 from moving in the pull-out direction in the distal end position of the arm portion 157.

Figure 35:
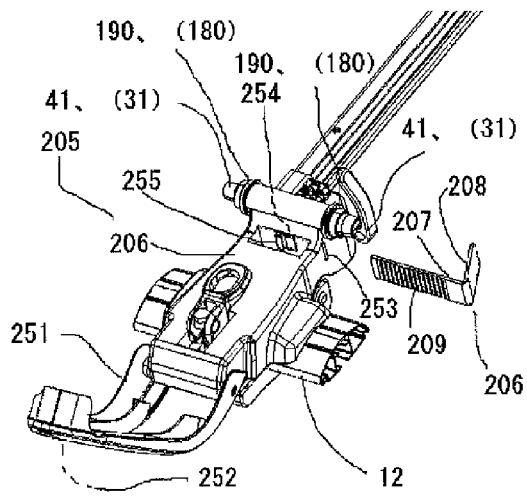
FIG. 35 is an exploded view when a shaft-diameter-20-mm through-axle-fork-use supporting body is selected according to a modification of the third embodiment of the present invention.
Figure 36:
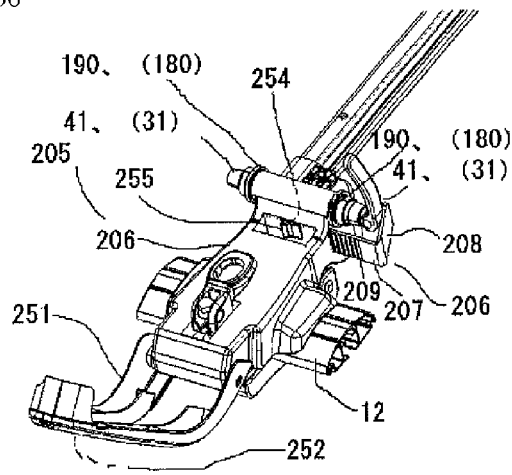
FIG. 36 is a reference perspective view illustrating a state before the shaft-diameter-20-mm through-axle fork is mounted according to the modification of the third embodiment of the present invention.
Figure 37:
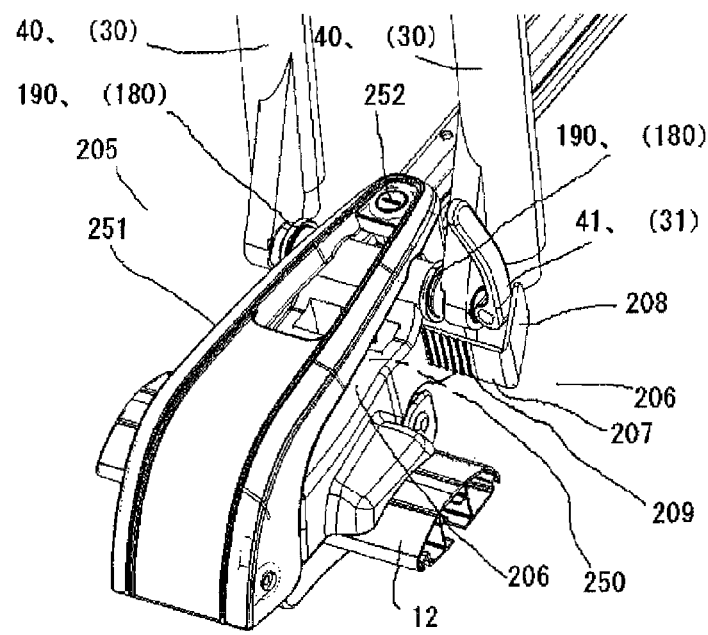
FIG. 37 is a reference perspective view illustrating a state after the shaft-diameter-20-mm through-axle fork is mounted according to the modification of the third embodiment of the present invention.
Figure 38:
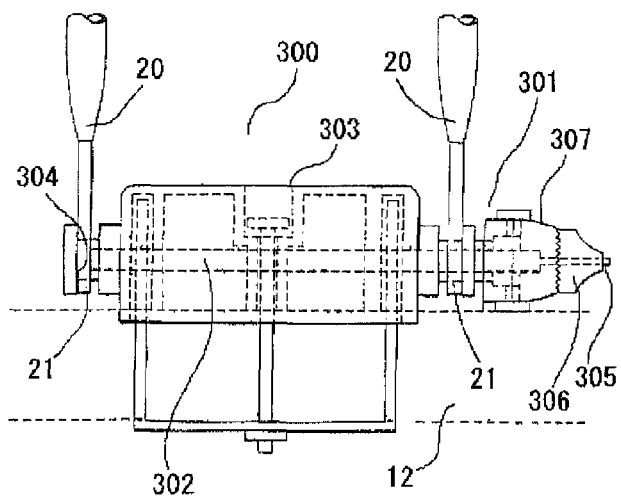
FIG. 38 is a reference diagram illustrating a conventional fork support device.
Figure 39:
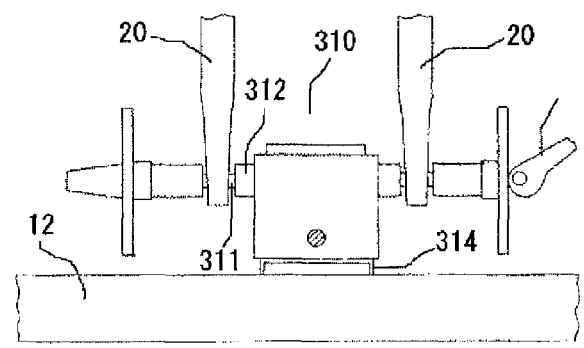
FIG. 39 is a reference diagram illustrating a conventional fork support device.
Figure 40:
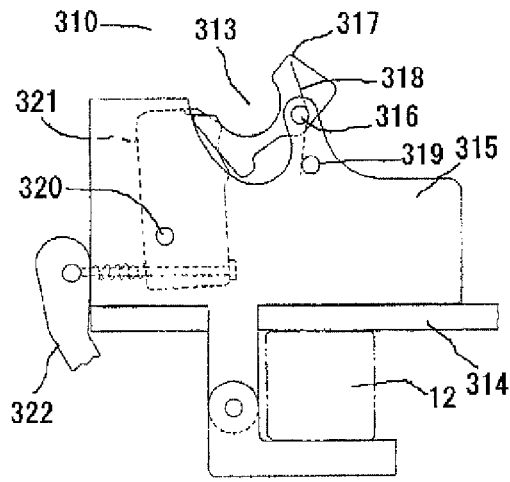
FIG. 40 is a reference diagram illustrating the conventional fork support device.
Figure 41:
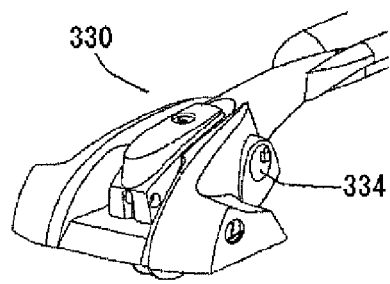
FIG. 41 is a reference diagram illustrating a conventional fork support device.
Figure 42:
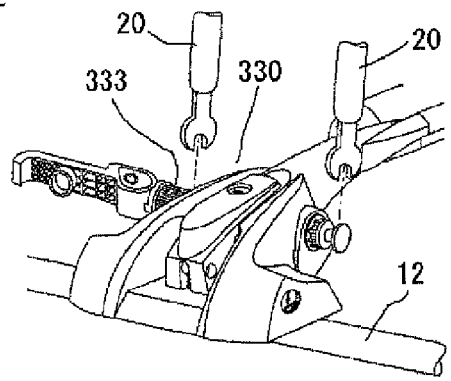
FIG. 42 is a reference diagram illustrating the conventional fork support device.
Figure 43:
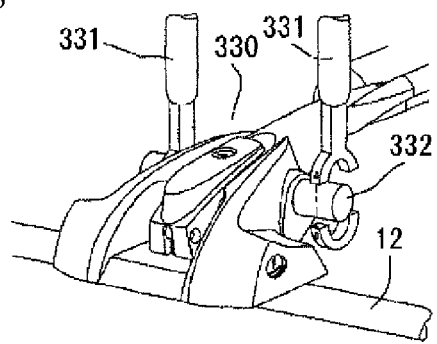
FIG. 43 is a reference diagram illustrating the conventional fork support device.

As a modification of Embodiment 3, as illustrated in FIG. 35 to FIG. 37, a guarding member 156 includes an arm portion 207 and a guarding portion 208. The arm portion 207 is formed to be insertable into a guiding portion 253 formed in the support-device main body 206 from any of the right and left side portions. In the distal end position of the arm portion 207, the guarding portion 208 prevents, the through axle 31 or 41 from moving in the pull-out direction. On at least one surface of the arm portion 207, a plurality of ratchet pawls 209 is formed along the right-left direction. The support-device main body 206 includes an engaging portion 254 formed to engage with the ratchet pawl 209 of the guarding member 206. In a space portion 250 of the support-device main body 206, a release operation portion 255 is formed to release the engaged state between the ratchet pawl 209 of the guarding member 206 and the engaging portion 254. In the state where a cover member 251 is opened with respect to the support-device main body 206, the release operation portion 255 can be operated. In the state where the cover member 251 is closed, it is difficult to operate the release operation portion 255 as a possible configuration. On the cover member 251, a key mechanism 252 is mounted, and the key mechanism 252 allows control for opening and closing the cover member 251 with respect to the support-device main body 206.

Here, the guarding members 156 and 206 are not limited to the fork support device described in the embodiment according to the present invention. The present invention can be carried out insofar as the fork support device can secure the through-axle fork, including the existing structures.

In the third embodiment, the description is given of the configuration in the case where the fork support device 145 is used to be secured to the carrier bar 12 secured to the roof of an automobile 1. The fork support device 145 may be secured a carrier bar secured to the back of an automobile, and may be secured to a rail mechanism arranged in contact with the top surface of the loading floor surface formed in the interior of an automobile. Further, the support device may be used to secure a bicycle to the location (for example, another vehicle or at home) other than the automobile.

INDUSTRIAL APPLICABILITY

Supporting the fork of a bicycle using the structure according to the present invention allows safely and simply carrying and keeping a bicycle, so as to ensure efficient use in industrial field.

DESCRIPTION OF REFERENCE SIGNS 1 automobile
2 bicycle
5 fork support device
6 support-device main body
10 floor surface
11 roof of automobile
12 carrier bar
13 rail member
20 conventional fork
21 groove portion
22 quick release skewer
23 support shaft
24 lever portion
25 quick-release-skewer adjusting nut
30 through-axle fork
31 through axle
32 insertion hole
40 through-axle fork
41 through axle
42 insertion hole
50 base member
51 extending portion
52 nut 54 knob bolt
55 depression-protrusion portion
56 securing mechanism
60 tubular column portion
61 vertical hole
62 depression-protrusion portion
63 through hole
64 end portion
65 cylindrical outer peripheral portion
66 guide groove
67 locking groove
68 shallow groove portion
70 supporting body
71 contacting portion
72 end-portion mounting portion
73 inner peripheral surface
74 rib
75 engaging protrusion
80 supporting body
81 contacting portion
82 end-portion mounting portion
83 inner peripheral surface
84 rib
85 engaging protrusion
90 supporting body
91 contacting portion
92 end-portion mounting portion
93 inner peripheral surface
94 rib
95 engaging protrusion
100 screw portion
101 nut portion
102 protrusion
103 two groove
104 shallow groove portion
145 fork support device
146 support-device main body
148 ring-shaped elastic body
150 space portion
151 cover member
152 key mechanism
156 guarding member
157 arm portion
158 guarding portion
160 through hole
161 end portion
162 cylindrical inner peripheral portion
164 groove portion
165 cylindrical outer peripheral portion
167 groove portion
170 supporting body
171 contacting portion
172 end-portion inserting portion
173 outer peripheral surface
174 groove portion
175 flange portion
180 supporting body
181 contacting portion
182 end-portion inserting portion
183 outer peripheral surface
184 groove portion
185 flange portion
190 supporting body
191 contacting portion
192 end-portion mounting portion
193 inner peripheral surface
194 groove portion
195 stepped portion
205 fork support device
206 support-device main body
250 space portion
251 cover member
252 key mechanism
253 guiding portion
254 engaging portion
255 release operation portion
206 guarding member
207 arm portion
208 guarding portion
209 ratchet teeth
300 fork support device
301 quick release skewer
302 support shaft
303 fork base
304 support surface
305 screw portion
306 adjusting knob
307 lever
310 fork support device
311 fork supporting shaft
312 intermediate rod
313 supporting unit
314 tray
315 main body frame
316 one pivot pin
317 one rod supporting tool
318 spring
319 control pin
320 other pivot pin
321 other rod supporting tool
322 lever unit
330 fork support device
331 through-axle fork
332 through-axle fork adaptor
333 conventional fork adaptor
334 hole

The invention claimed is:

1. A bicycle-fork support device for removably securing a fork distal end portion of a bicycle in a state where a front wheel hub is removed from the bicycle, the support device comprising a support-fork switching unit configured to support at least two types of forks including: a conventional fork where an inverse U-shaped or C-shaped groove portion is formed in a lower end portion of the conventional fork, the U-shaped or C-shaped groove portion allowing insertion of a quick-release-skewer support shaft of a conventional bicycle; and a through-axle fork where a through-axle insertion hole for securing a through-axle hub is formed in a lower end portion of the through-axle fork, wherein the support-fork switching unit includes:
a support-device main body where a hollow portion is formed to pass through the support-device main body in a right-left direction, the hollow portion allowing passage of both the quick-release-skewer support shaft and a through axle;
open end portions arranged in respective right and left end portions of the hollow portion; and
supporting bodies configured to be attachable and removable with respect to the open end portions corresponding to a type of support fork,
wherein the bicycle-fork support device further includes a guarding member where a guarding portion is formed, the guarding portion being configured to prevent the through axle from moving in a pull-out direction, the guarding member is removable or movable with respect to the support-device main body, and includes: an arm portion and the guarding portion, the arm portion extending in at least one direction of right and left directions in a state mounted on the support-device main body, the guarding portion being arranged at an extending-portion position of an axis line of the through axle at a distal end position of the arm portion, and a key unit is configured to maintain a mounted state or a position of the guarding member on the support-device main body in an antitheft state.

2. The bicycle-fork support device according to claim 1, wherein the supporting bodies include:

a pair of conventional-fork-use supporting bodies including a contacting portion formed at least in a position at one side, the contacting portion having an internal shape that fits the support shaft of the quick release skewer;

a pair of through-axle-fork-use supporting bodies including a contacting portion formed at least in a position at one side, the contacting portion having an internal shape that fits the through axle; and a unit configured to removably mount a portion at another side of the supporting body selected as any of the conventional-fork-use supporting body and the through-axle-fork-use supporting body corresponding to a type of fork to support, on the right and left end portions of the support-device main body.

3. The bicycle-fork support device according to claim 2, wherein the unit configured to removably mount the supporting bodies on the right and left end portions includes: respective outer peripheral portions formed in the right and left end portions; and inner peripheral portions formed in the positions at the other side of the supporting bodies, the inner peripheral portions being mountable to the outer peripheral portions of the end portion.

4. The bicycle-fork support device according to claim 3, wherein the unit configured to removably mount the supporting bodies on the right and left end portions includes: locking portions formed in the outer peripheral portions of the right and left end portions; and an engaging unit for engaging the locking portion, the engaging unit being formed in the inner peripheral portions in the positions at the other side of the supporting bodies.

5. The bicycle-fork support device according to claim 3, wherein the unit configured to removably mount the supporting bodies on the right and left end portions includes: a friction unit arranged in at least one of: the outer peripheral portions of the right and left end portions; and the inner peripheral portions formed in the positions at the other side of the supporting bodies.

6. The bicycle-fork support device according to claim 2, wherein the unit configured to removably mount the supporting bodies on the right and left end portions includes: respective inner peripheral portions formed in the right and left end portions; and outer peripheral portions formed in the positions at the other side of the supporting bodies, the outer peripheral portions being mountable to the inner peripheral portions of the end portion.

7. The bicycle-fork support device according to claim 6, wherein the unit configured to removably mount the supporting bodies on the right and left end portions includes: locking portions formed in the inner peripheral portions of the right and left end portions; and an engaging unit for engaging the locking portion, the engaging unit being formed in the outer peripheral portions in the positions at the other side of the supporting bodies.

8. The bicycle-fork support device according to claim 6, wherein the unit configured to removably mount the supporting bodies on the right and left end portions includes: a friction unit arranged in at least one of: the inner peripheral portions of the right and left end portions; and the outer peripheral portions formed in the positions at the other side of the supporting bodies.

9. The bicycle-fork support device according to claim 2, wherein the through-axle-fork-use supporting bodies include at least a 15-mm through-axle supporting body and a 20-mm through-axle supporting body prepared in advance, the 15-mm through-axle supporting body including a contacting portion with an internal shape that fits a through axle with a nominal diameter of 15 mm, the 20-mm through-axle supporting body including a contacting portion with an internal shape that fits a through axle with a nominal diameter of 20 mm.

10. The bicycle-fork support device according to claim 1, wherein on a top surface of the support-device main body, a space portion is formed, the space portion allowing arranging a handle portion of the quick release skewer, in an upper portion of the support-device main body, a cover member is arranged, the cover member covering a top surface of the space portion formed in the upper portion of the support-device main body, the key unit is mounted on the cover member and is configured to control opening and closing of the cover member with respect to the support-device main body, and the guarding member is securable between the support-device main body and the cover member.

11. The bicycle-fork support device according to claim 1, wherein on a top surface of the support-device main body, a space portion is formed, the space portion allowing arranging a handle portion of the quick release skewer, in an upper portion of the support-device main body, a cover member is arranged, the cover member covering a top surface of the space portion formed in the upper portion of the support-device main body, the key unit is mounted on the cover member and is configured to control opening and closing of the cover member with respect to the support-device main body, and in a state where the cover member is closed, the cover member is configured to cover an adjusting unit configured to adjust the moving position of the guarding member formed in the support-device main body.

12. The bicycle-fork support device according to claim 3, wherein the through-axle-fork-use supporting bodies include at least a 15-mm through-axle supporting body and a 20-mm through-axle supporting body prepared in advance, the 15-mm through-axle supporting body including a contacting portion with an internal shape that fits a through axle with a nominal diameter of 15 mm, the 20-mm through-axle supporting body including a contacting portion with an internal shape that fits a through axle with a nominal diameter of 20 mm.

13. The bicycle-fork support device according to claim 4, wherein
the through-axle-fork-use supporting bodies include at least a 15-mm through-axle supporting body and a 20-mm through-axle supporting body prepared in advance, the 15-mm through-axle supporting body including a contacting portion with an internal shape that fits a through axle with a nominal diameter of 15 mm, the 20-mm through-axle supporting body including a contacting portion with an internal shape that fits a through axle with a nominal diameter of 20 mm.

14. The bicycle-fork support device according to claim 5, wherein
the through-axle-fork-use supporting bodies include at least a 15-mm through-axle supporting body and a 20-mm through-axle supporting body prepared in advance, the 15-mm through-axle supporting body including a contacting portion with an internal shape that fits a through axle with a nominal diameter of 15 mm, the 20-mm through-axle supporting body including a contacting portion with an internal shape that fits a through axle with a nominal diameter of 20 mm.

15. The bicycle-fork support device according to claim 6, wherein
the through-axle-fork-use supporting bodies include at least a 15-mm through-axle supporting body and a 20-mm through-axle supporting body prepared in advance, the 15-mm through-axle supporting body including a contacting portion with an internal shape that fits a through axle with a nominal diameter of 15 mm, the 20-mm through-axle supporting body including a contacting portion with an internal shape that fits a through axle with a nominal diameter of 20 mm.

16. The bicycle-fork support device according to claim 7, wherein
the through-axle-fork-use supporting bodies include at least a 15-mm through-axle supporting body and a 20-mm through-axle supporting body prepared in advance, the 15-mm through-axle supporting body including a contacting portion with an internal shape that fits a through axle with a nominal diameter of 15 mm, the 20-mm through-axle supporting body including a contacting portion with an internal shape that fits a through axle with a nominal diameter of 20 mm.

* * * * *